US009367722B2

(12) United States Patent
Xian et al.

(10) Patent No.: US 9,367,722 B2
(45) Date of Patent: *Jun. 14, 2016

(54) INDICIA READING SYSTEM EMPLOYING DIGITAL GAIN CONTROL

(71) Applicant: Metrologic Instruments, Inc., Blackwood, NJ (US)

(72) Inventors: Tao Xian, Columbus, NJ (US); Gennady Germaine, Cherry Hill, NJ (US); Xiaoxun Zhu, Marlton, NJ (US); Ynjiun Paul Wang, Cupertino, CA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,818

(22) Filed: Jun. 18, 2015

(65) Prior Publication Data

US 2015/0310244 A1 Oct. 29, 2015

Related U.S. Application Data

(63) Continuation of application No. 14/305,153, filed on Jun. 16, 2014, now Pat. No. 9,064,167, which is a continuation of application No. 13/888,884, filed on May 7, 2013, now Pat. No. 8,752,766.

(60) Provisional application No. 61/632,423, filed on May 7, 2012.

(51) Int. Cl.
*G06K 7/10* (2006.01)
*G06K 7/14* (2006.01)

(52) U.S. Cl.
CPC ............ *G06K 7/10851* (2013.01); *G06K 7/10* (2013.01); *G06K 7/10554* (2013.01); *G06K 7/10613* (2013.01); *G06K 7/10633* (2013.01); *G06K 7/146* (2013.01)

(58) Field of Classification Search
CPC ........... G06K 7/10; G06K 9/22; G06K 19/06; G02B 26/10; G06F 17/00
USPC .................. 235/462.26, 462.45, 472.01, 375, 235/462.25
See application file for complete search history.

(56) References Cited

U.S. PATENT DOCUMENTS

| | | | |
|---|---|---|---|
| 4,792,666 | A | 12/1988 | Cherry et al. |
| 4,843,222 | A | 6/1989 | Hochgraf |
| 5,148,008 | A | 9/1992 | Takenaka |
| 5,168,148 | A | 12/1992 | Giebel |
| 5,288,983 | A | 2/1994 | Nakazawa |

(Continued)

*Primary Examiner* — Edwyn Labaze
(74) *Attorney, Agent, or Firm* — Additon, Higgins & Pendleton, P.A.

(57) ABSTRACT

A scanning code symbol reading system includes an analog scan data signal processor for producing digitized data signals, wherein during each laser beam scanning cycle, a light collection and photo-detection module generates an analog scan data signal corresponding to a laser scanned code symbol, an analog scan data signal processor/digitizer processes the analog scan data signal to generate digital data signals corresponding thereto, and a synchronized digital gain control module automatically processes the digitized data signals in response to start of scan (SOS) signals generated by a SOS detector. The synchronized digital gain control module generates digital control data which is transmitted to the analog scan data signal processor for use in controlling the gain of a signal processing stage in the light collection and photo-detection module and/or analog scan data signal processor, during the corresponding laser beam scanning cycle.

20 Claims, 18 Drawing Sheets

(56) References Cited

U.S. PATENT DOCUMENTS

| | | |
|---|---|---|
| 5,612,259 A | 3/1997 | Okutomo et al. |
| 5,701,003 A | 12/1997 | Chisholm et al. |
| 5,914,478 A | 6/1999 | Bridgelall |
| 6,073,848 A | 6/2000 | Giebel |
| 6,138,915 A | 10/2000 | Danielson et al. |
| 6,827,272 B2 | 12/2004 | Kolstad |
| 7,172,125 B2 | 2/2007 | Wang et al. |
| 7,822,349 B2 | 10/2010 | Roosli et al. |
| 8,752,766 B2 | 6/2014 | Xian et al. |
| 2012/0153022 A1 | 6/2012 | Havens et al. |

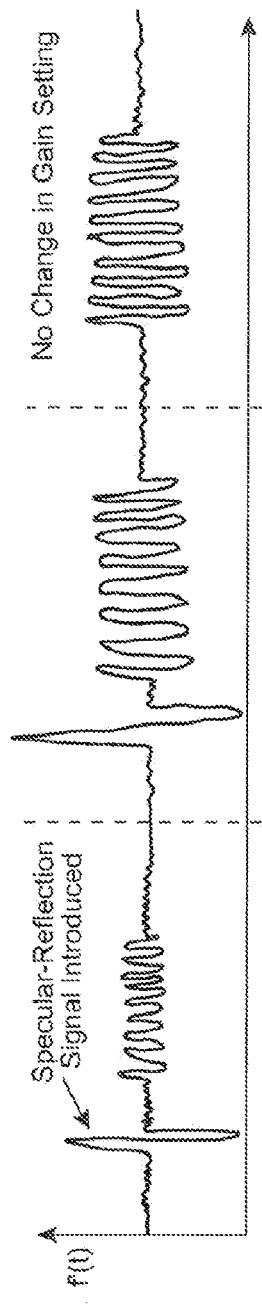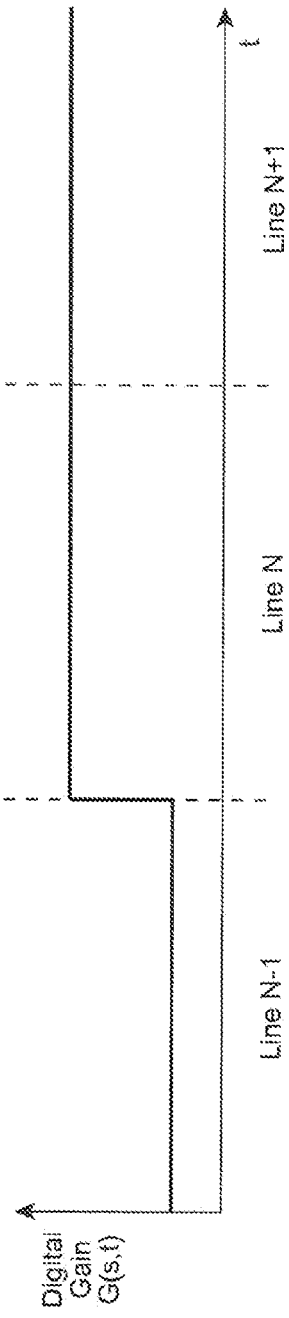

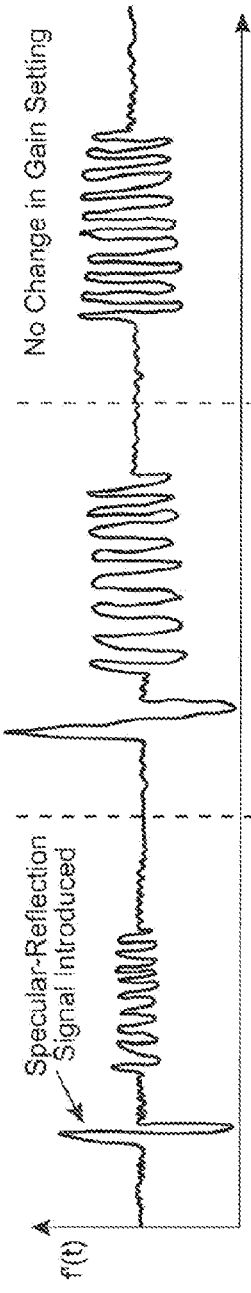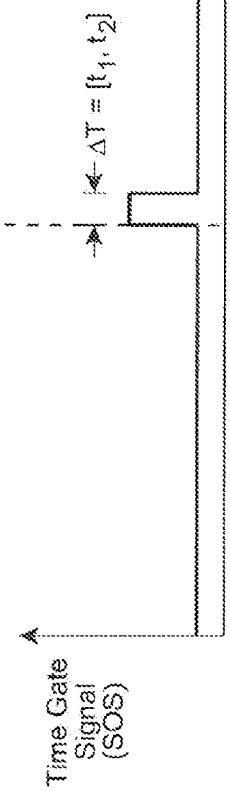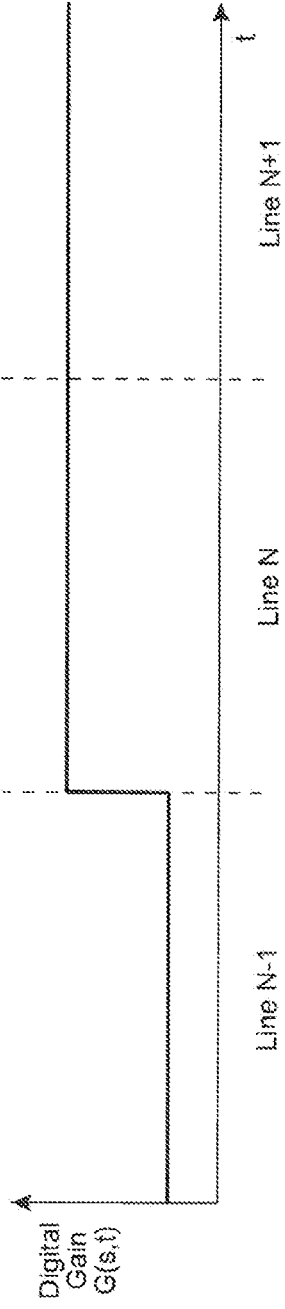

INDICIA READING SYSTEM EMPLOYING DIGITAL GAIN CONTROL

CROSS-REFERENCE TO RELATED APPLICATIONS

The present application claims the benefit of U.S. patent application Ser. No. 14/305,153 for an Indicia Reading System Employing Digital Gain Control filed Jun. 16, 2014 (and published Oct. 2, 2014 as U.S. Patent Publication No. 2014/0291403), now U.S. Pat. No. 9,064,167, which claims the benefit of U.S. patent application Ser. No. 13/888,884 for an Indicia Reading System Employing Digital Gain Control filed May 7, 2013 (and published Nov. 7, 2013 as U.S. Patent Application Publication No. 2013/0292474), now U.S. Pat. No. 8,752,766, which claims the benefit of U.S. Patent Application No. 61/632,423 for a Laser Scanning Code Symbol Reading System Employing Synchronized Digital Gain Control (SDGC), filed May 7, 2012. Each of the foregoing patent applications, patent publications, and patents is hereby incorporated by reference in its entirety.

BACKGROUND

The present disclosure relates generally to improvements in reading code symbols on objects located anywhere over a large scanning range (e.g. 3 inches to over 30 feet from scanning window), and more particularly, to an improved method of and apparatus for processing analog scan data signals received during the laser scanning of objects located over large scanning distances.

It is well known to scan bar code symbols on objects for purposes of automatically identifying the objects in diverse fields of use. Currently, several basic optical methods have been developed over the past three or more decades.

According to one method, bar code symbols are read by scanning a laser beam across the bar code symbol, and collecting and processing light from the return laser beam to extract information modulated onto the scanned beam by the light reflective characteristics of the bar code structure.

According to a second method, bar code symbols are read by capturing and buffering a digital image of a bar code symbol, and processing the digital image to recognize the bar code structure.

When using either method described above, the further that the object bearing the bar code symbol resides from a laser scanner, the weaker the return laser light signal will be at the time of signal detection at the photo-detector. Likewise, the further that the object bearing the bar code symbol resides from a digital imager, the weaker digital image intensity will be at the time of image detection. For laser scanners having a substantially large scanning, or working range, in particular, this potentially dramatic variation in signal intensity strength at the photo-detector places great demands on the electronic signal processing circuitry, and its ability to deliver sufficient signal-to-noise-ratio (SNR) performance over broad dynamic ranges of input signal operation.

Consequently, great efforts have been made over the past few decades to provide laser scanning type bar code scanners, in particular, with automatic gain control (AGC) capabilities that aim to control the gain of the various analog scan data signal processing stages, regardless of the input laser return signal strength. The following U.S. patents describe prior art efforts to date to provide automatic gain control (AGC) capabilities in laser scanning bar code symbol readers: U.S. Pat. Nos. 7,822,349; 7,172,125; 6,827,272; 6,073,848; 5,914,478; 5,701,003; 5,612,259; 5,288,983; 5,168,148; 5,148,008; 4,843,222; and 4,792,666, incorporated herein by reference as set forth herein.

In general, a feedback control is implemented in the analog domain, and the gain of an amplified stage is adjusted according to a controller. The controller could be, but is not limited to, proportional control, PID control or fuzzy logic control, etc. Also, the amplifier refers to, but is not limited to preamplifier or gain stages along the signal path.

When performing middle and long range laser scanning, variable gains along the signal processing chain are desired to improve signal quality. Such multi-stage gain control is extremely important when a barcode target is located in the far field, which could be at least 30 feet away from the laser scanner.

During laser scanning bar code symbols, it is preferred that the gain is maintained substantially constant during each scan line sweep so that signal linearity is maintained, which is important for the barcode decoding. However, the AGC circuitry must have a fast response time once the object scanning distance, and/or other parameters, are changed. Thus, automatic gain control (AGC) suffers from a dilemma: how to maintain fast response time without sacrificing signal linearity during each scanning cycle.

Conventional analog AGC circuits have to change the gain continuously which limits the response time for automatic gain control. Moreover, the requirement of linearity during scan line generation further limits the usage of conventional AGC techniques in many applications. Also, it is known that digital AGC circuits can respond quickly between gain changes which gain adjustment significantly faster than analog-based AGC circuits.

However, despite the many improvements in AGC methods in laser scanning bar code symbol readers over the years, there is still a great need in the art for improved laser scanning bar code symbol reading system which exhibits fast response time and signal linearity, while avoiding the shortcomings and drawbacks of prior art systems and methodologies.

SUMMARY

Accordingly, a primary object of the present disclosure is to provide improved laser scanning bar code symbol reading system for use in diverse environments, which is free of the shortcomings and drawbacks of prior art systems and methodologies.

Another object is to provide a laser scanning bar code symbol reading system, wherein a synchronized digital gain control (SDGC) module is provided for controlling the gain of analog signal processing circuitry in a new way which improves response time without sacrificing signal linearity characteristics of the system.

Another object is to provide a laser scanning bar code symbol reading system, wherein the synchronized digital gain control (SDGC) module is synchronized using the start of scan (SOS) signals generated each time the laser scanning assembly undergoes a complete scanning cycle, and discrete gain changes are generated and provided to the gain stage only at a certain windows along the time domain.

Another object is to provide a laser scanning bar code symbol reading system, wherein the synchronized digital gain control (SDGC) module can be used to implement gain adjustments at one or more points along the analog scan data signal path such as, but not limited to, preamplifier stages, derivative stages, and filtering stages.

Another object is to provide a laser scanning code symbol reading system within an analog scan data signal processor, wherein a synchronized digital gain control module automatically controls the gain of at least one signal processing stage within the analog scan data signal processor, during each laser beam scanning cycle, in time synchronous manner using (i) start of scan (SOS) signals generated by a SOS detector and (ii) digitized data signals generated by the analog scan data signal processor.

Another object is to provide a laser scanning code symbol reading system having an analog scan data signal processor for producing digitized data signals, wherein during each laser beam scanning cycle, a synchronized digital gain control module processes the digitized data signals in response to start of scan (SOS) signals and generates digital control data that is transmitted to the analog scan data signal processor for controlling the gain of a signal processing stage therein during a corresponding laser beam scanning cycle.

Another object is to provide a method of controlling the gain of a signal processing stage within the analog scan data signal processor of a laser scanning code symbol reading system employing a laser scanning module, a start of scan (SOS) detector, and a synchronized digital gain control module.

Another object is to provide a method of controlling the gain of a signal processing stage within a laser scanning code symbol reading system, wherein a synchronized digital gain control module uses SOS signals to determine when to sample and process digitized data signals, and generate digital control data for use by at least one signal processing stage to control the gain of thereof during a corresponding laser beam scanning cycle.

Another object is to provide a method of controlling the gain of a signal processing stage within a laser scanning code symbol reading system, wherein digital gain control data is automatically produced during each laser beam scanning cycle, by a process comprising: (i) calculating a histogram from the digitized data signal sampled over a time interval determined using start of scan (SOS) signals; (ii) calculating a cumulative histogram from the calculated histogram; (iii) calculating the discrete gain value for the current laser beam scanning cycle, using the cumulative histogram; and (iv) calculating a discrete gain change value from the discrete gain value, and using the discrete gain change value, as well as digital control data, to control the gain of the at least one signal processing stage.

Another object is to provide such a method of controlling the gain of a signal processing stage within a laser scanning code symbol reading system, wherein the digital data signal can be either a digital representation of (i) the raw analog scan data signal intensity, or (ii) first derivative of the analog scan data signal, produced by the photo-collection and photo-detection module of the system during laser scanning operations.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIGS. 6B through 6D, when taken together, illustrate how the SDGC module controls the gain of a derivative processing stage with amplification, processing (the first or second) derivative of the analog scan data signal, over three consecutive time windows (i.e. laser beam scanning cycles);

FIGS. 8B through 8D, when taken together, illustrate how the SDGC module controls the gain of a signal filtering stage with amplification, processing a filtered (first or second) derivative of the analog scan data signal, over three consecutive time windows (i.e. laser beam scanning cycles);

DETAILED DESCRIPTION

Figure 1:
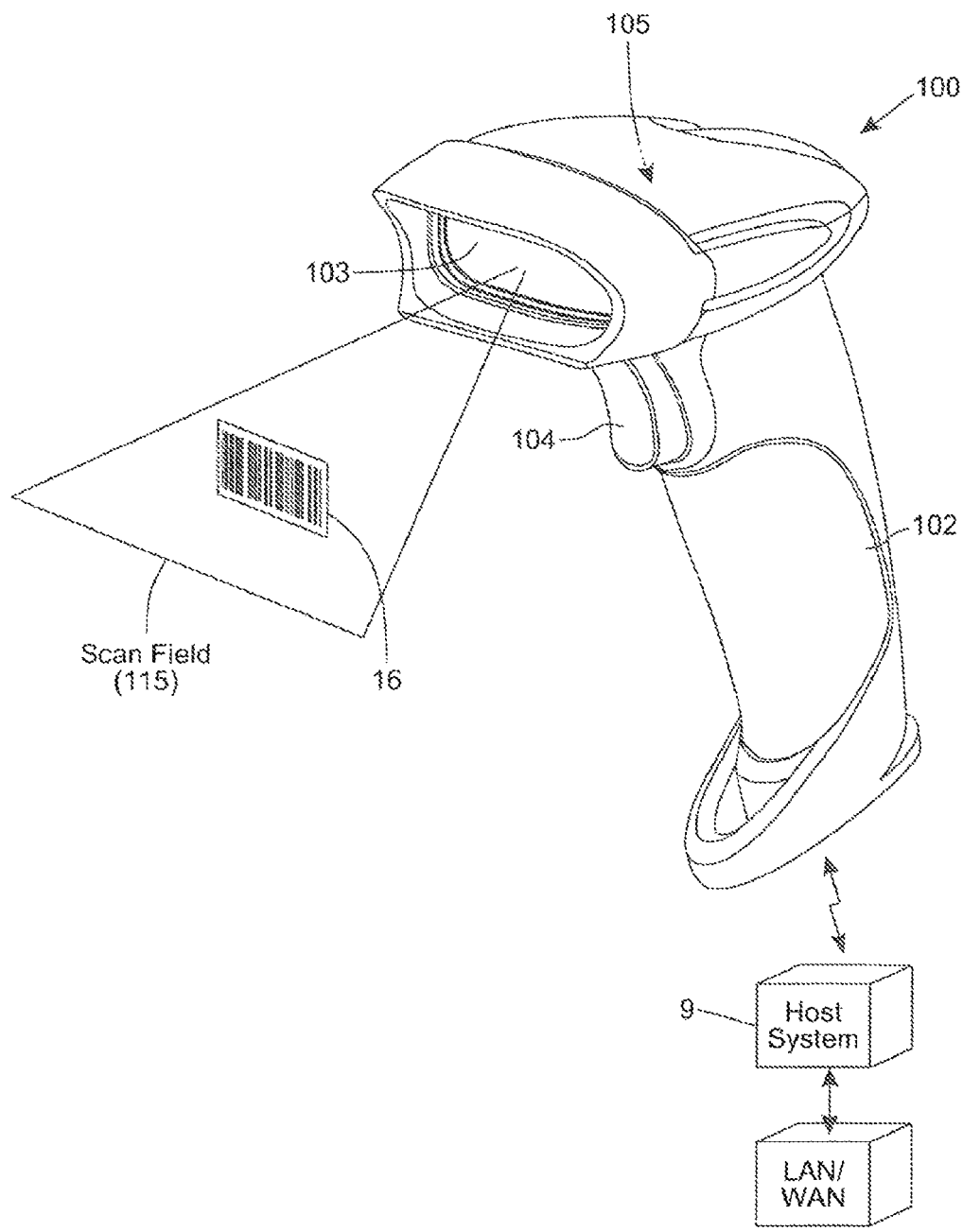
FIG. 1 is a perspective view of an illustrative embodiment of a hand-supportable laser scanning bar code symbol reading system of the present disclosure, having the capacity to read bar code symbols over a large working range where the intensity of return laser signals will vary drastically due to distance-related attenuation factors.

Referring to the figures in the accompanying Drawings, the illustrative embodiments of the dual laser-scanning bar code symbol reading system and will be described in great detail, wherein like elements will be indicated using like reference numerals Overview of the Laser Scanning Bar Code Symbol Reading System Employing Synchronized Digital Gain Control Referring now to FIGS. 1 through 2, the hand-supportable laser scanning bar code symbol reading system 1 will be described in detail.

Figure 2:
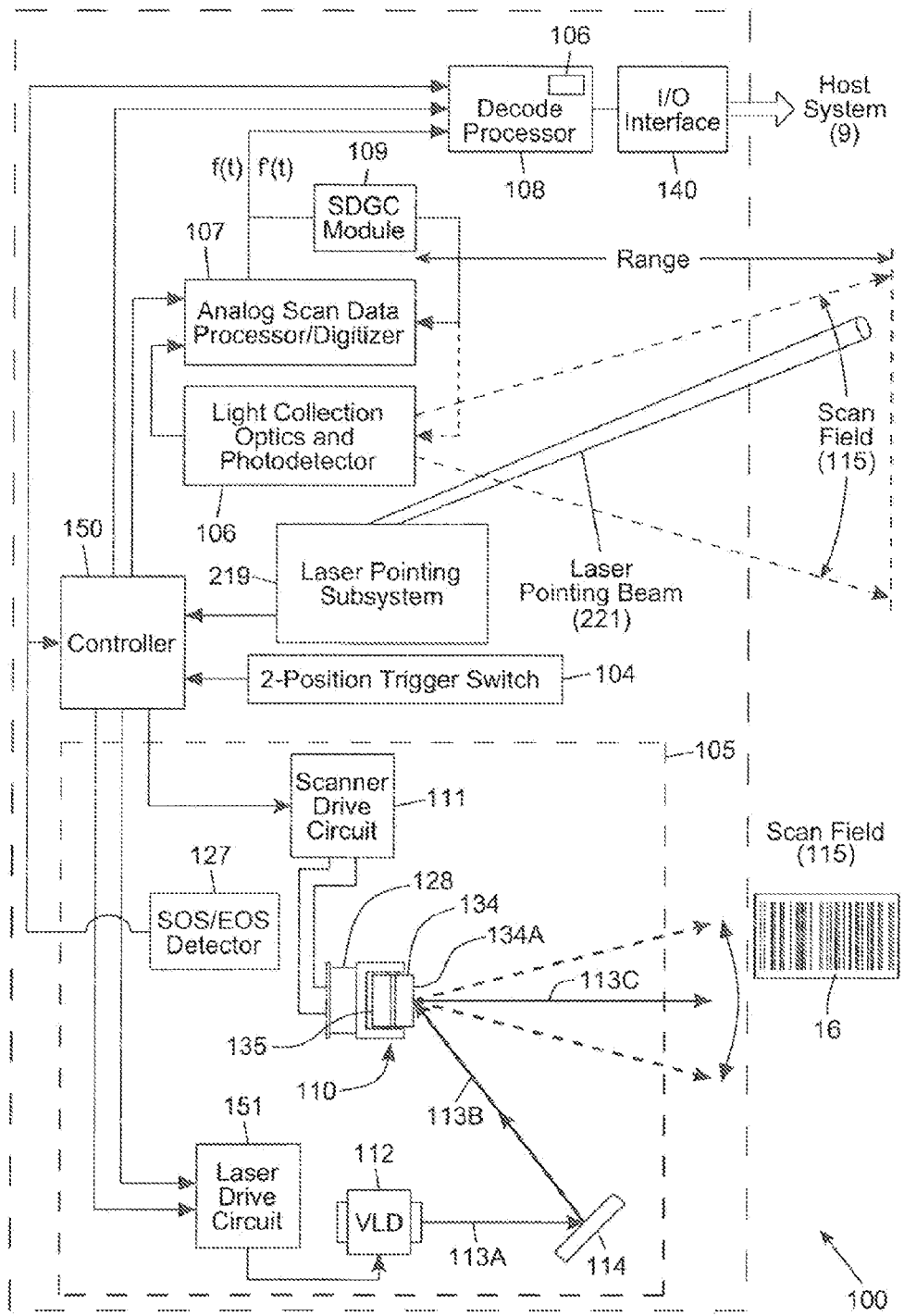
FIG. 2 is a schematic block diagram of the system shown in FIG. 1, describing the major system components of the laser scanning bar code symbol reading system illustrated in FIG. 1, including the synchronized digital gain control (SDGC) module of the present disclosure.

As shown in FIGS. 1 and 2, the hand-supportable laser scanning bar code symbol reading system 100 is shown comprising the following components: a hand-supportable housing 102 having a head portion and a handle portion supporting the head portion; a light transmission window 103 integrated with the head portion of the housing 102; a 2-position manually-actuated trigger switch 104 integrated with the handle portion of the housing 102, for sending trigger signals to controller 150 and activating the laser pointing/aiming subsystem 219 and the laser scanning module 105; a laser scanning module 105, for repeatedly scanning, across the laser scanning field, a visible laser beam generated by a laser source 112 (e.g. VLD or IR LD) having optics to produce a laser scanning beam focused in the laser scanning field, in response to a control signal generated by a system controller 150; wherein the laser scanning module 105 also includes a laser drive circuit 151 for receiving control signals from system controller 150, and in response thereto, generating and delivering laser (diode) drive current signal to the laser source 112 to produce a laser scanning beam during the method of bar code symbol reading described in FIG. 4; a start of scan/end of scan (SOS/EOS) detector 127 for generating SOS timing signals indicating the start of each laser beam sweep (i.e. scanning cycle), and EOS timing signals indicating the end of each laser beam sweep, and sending these SOS/EOS timing signals to the system controller 150, as well as decode processor 108 and SDGC module 109; a set of scan line data line buffers 160 for buffering each complete line of scan data collected during a complete sweep of the laser scanning beam across the laser scanning field during each scanning cycle (i.e. one buffer for each scanning directions); a photo (i.e. light) collection and photo-detection module 106, including (i) light collection optics for collecting light reflected/scattered from a scanned object in the scanning field, and (ii) a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; a scan data signal intensity detection module 143, preferably implemented within scan data processor/digitizer 107, for continuously (i) processing the return analog (or digital) scan data signals, (ii) detecting and analyzing the intensity (i.e. magnitude) of the laser return signal, (iii) determining (e.g. estimating) the range or distance of the scanned object, relative to the scanning window, and then (iv) transmitting the range indication (i.e. estimation) signal (e.g. in the form of a digital data value) to the decode processor 108 so that it can program or set an appropriate laser beam sweep angle α(t), as required in any given application; programmed decode processor 108 for decode processing digitized data signals, and generating symbol character data representative of each bar code symbol scanned by the laser scanning beam; a synchronized digital gain control (SDGC) module 109, interfaced with the analog scan data processor/digitizer (ASIC chip) 107 and light collection and photo-detection module 106, for controlling the gain of at least one stage within the analog scan data signal processor/digitizer 107 and/or the light collection and photo-detection module 106, on a real-time, scanning-cycle basis; an input/output (I/O) communication interface module 109 for interfacing with a host communication system and transmitting symbol character data thereto via wired or wireless communication links that are supported by the symbol reader and host system; and a system controller 150 for generating the necessary control data signals for controlling operations within the hand-supportable laser scanning bar code symbol reading system.

As shown in FIG. 2, the laser scanning module 105 comprises a number of subcomponents, namely: laser scanning assembly 110 with an electromagnetic coil 128 and rotatable scanning element 134 supporting a polygon mirror 134A, or an oscillating (or flipper) type laser scanning mechanism 134 supporting a planar mirror element 134A; a coil drive circuit 111 for generating an electrical drive signal to drive the electromagnetic coil 128 in the laser scanning assembly 110; and a laser beam source 112 for producing a visible laser beam 113A; and a beam deflecting mirror 114 for deflecting the laser beam 113A as incident beam 113B towards the mirror component of the laser scanning assembly 110, which sweeps the deflected laser beam 113C across the laser scanning field and a bar code symbol 16 that might be simultaneously present therein during system operation.

As shown in FIG. 2, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a drive circuit 111 so that it generates magnetic forces on opposite poles of the permanent magnet 135, during scanning assembly operation.

Figure 3A:
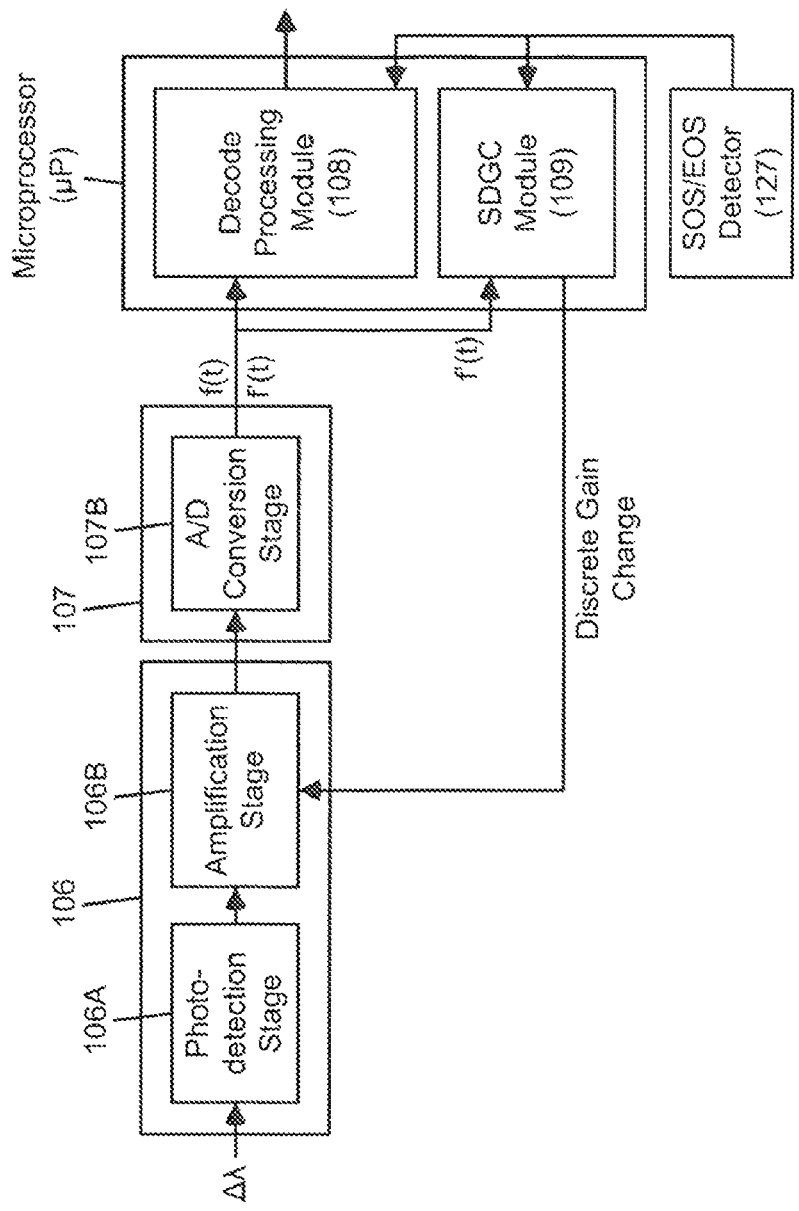
FIG. 3A is a schematic block diagram describing the major system components of the laser scanning bar code symbol reading system illustrated in FIG. 1, showing the primary stages of a first illustrative embodiment of the synchronized digital gain control (SDGC) subsystem and process of the present disclosure, including (i) a light collection and photo-detector module with a photo-detection stage and a digitally-controlled pre-amplification stage with amplification controlled by its gain setting, and (ii) an analog scan data processing/digitizer module having an A/D signal conversion stage.

Specification of the First Illustrative Embodiment of the Synchronized Digital Gain Control (SDGC) Process of the Present Disclosure FIG. 3A describes a first illustrative embodiment of a synchronized digital gain control (SDGC) subsystem and process supported in the laser scanning bar code symbol reading system of FIG. 1. As shown, the decode processor 108 and SDGC module 109 are realized by a programmed microprocessor and associated memory architecture, and both modules receive SOS and EOS timing signals from the SOS/EOS detector 127 which can be realized using Hall-effect sensor and one or more permanent magnets embedded in the scanner rotor, or other techniques well known in the art.

As shown in FIG. 3A, the photo-collection and photo-detection module 106 includes at least a photo-detection stage 106A and a digitally-controlled pre-amplification stage 106B. The digitally-controlled pre-amplification stage 106B receives a discrete gain change signal (i.e. digital control data) $\Delta G(S, t)$ from the microprocessor-implemented SDGC module 109. The rate at which the module 106 receives discrete gain control updates depends on the frequency of the laser scanning mechanism (e.g. flipper mechanism, rotating polygon, etc), which is effectively measured by start of scan (SOS) signals generated by the SOS/EOS detector 12. As shown in the first illustrative embodiment of FIG. 3B, the SDGC module 109 updates the gain of the amplification stage 106B of light collection and photo-detection module 106 once every laser beam scanning cycle, using the synchronized digital gain control (SDGC) process depicted in FIGS. 4B and 4C. Notably, the SDGC process is called during the main control process shown in FIG. 4A, carried out in the laser scanning bar code symbol reading system 1 shown in FIG. 1, to be described herein below.

In response to a triggering event (i.e. manually pulling trigger 104 to its first position), the system controller 150 enables subsystem 219 to generate and project a cone-like visible aiming beam 221 within the laser scanning field 115 of the system. After the aiming beam 221 is aligned with the bar code symbol to be scanned, the user pulls the trigger switch 104 to its second position. In response, the system controller 150 enables the laser scanning module 105 to generate and project a laser scanning beam through the light transmission window 103, and across the laser scanning field external to the hand-supportable housing, for scanning an object in the scanning field. The laser scanning beam is generated by laser beam source 112 in response to control signals generated by the system controller 150. The scanning element (i.e. mechanism) 134 begins to repeatedly scan the selected laser beam across a code symbol residing on an object in the laser scanning field 115. Then, the light collection optics 106 collects light reflected/scattered from scanned code symbols on the object in the scanning field, and the photo-detector (in the photo-detection stage 106A) automatically detects the intensity of collected light (i.e. photonic energy) and generates an analog scan data signal (i.e. bar code pattern signal) corresponding to the light intensity detected during scanning operations. The analog scan data signal processor/digitizer module 107 processes the analog scan data signals, and the A/D conversion stage 107B converts the processed analog scan data signals into digitized data signals including the digital raw intensity data signal f(t) corresponding to the intensity of raw (i.e. unfiltered) analog scan data signal, and also the digital first derivative data signal f'(t) during processing at a differentiation stage (not shown) within processor/digitizer module 107. While both the digital raw intensity data signal f(t) and the digital first derivative data signal f'(t) are typically transmitted to the programmed decode processor 108 for use during decode processing, only the digital raw intensity data signal f(t) is transmitted to the SDGC module 109 for processing in this illustrative embodiment. However, in other illustrative embodiments, both the digital raw intensity data signal f(t) and the digital first derivative data signal f'(t) can be transmitted to the SDGC module 109 for use in generating gain control data signals.

The SOS/EOS detector 127 generates a SOS signal upon detecting the start of the first and each subsequent laser beam scanning cycle, and these SOS signals are transmitted to the SDGC module 109 and the programmed decode processor 108. The SDGC module 109 uses the SOS signal from detector 127 and raw digital intensity data signal f(t) from the scan data signal processor/digitizer module 107 to generate digital control data signals for transmission to the digitally-controlled analog signal amplification stage 106B within the light collection and photo-detection module 106, to control the gain thereof, during a corresponding scanning cycle, in accordance with the principles of the present disclosure, to be described in greater detail herein. This process is repeated each cycle to control the gain of the amplification stage in module 6. Also, the programmed decode processor 108 decode processes digitized data signals, and generates symbol character data representative of each bar code symbol scanned by the laser scanning beam. Symbol character data corresponding to the bar codes read by the decoder 108 is then transmitted to the host system via the I/O communication interface 140 which may support either a wired and/or wireless communication link, well known in the art. During laser scanning operations, the system controller 150 automatically generates the necessary control signals for controlling operations within the hand-supportable laser scanning bar code symbol reading system.

Figure 4A:
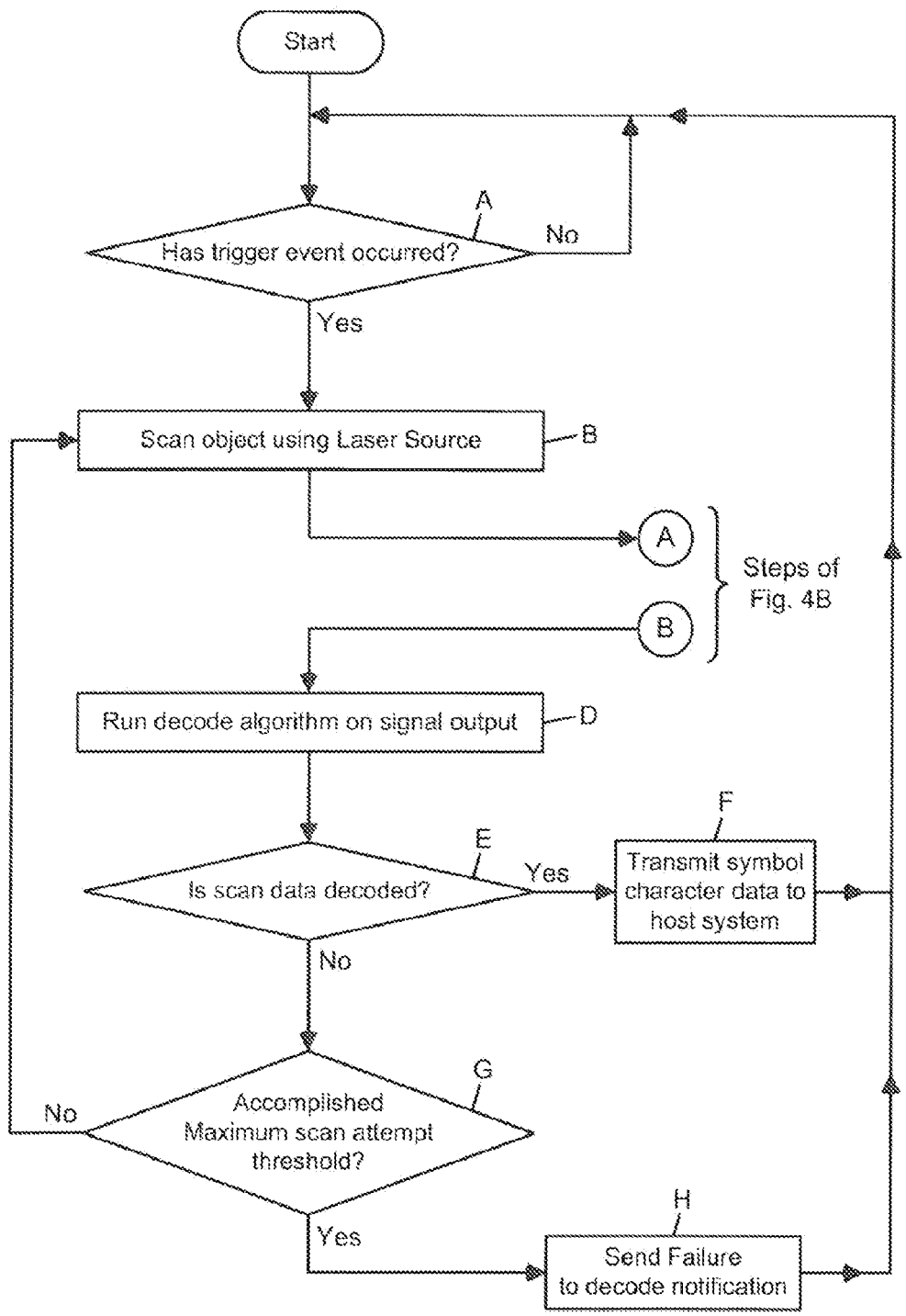
FIG. 4A is a flow chart describing the primary steps carried out in the laser scanning bar code symbol reading system of FIG. 3A, wherein upon detecting a trigger event in the system, the bar code symbol is automatically laser scanned, and scan data is captured and processed to automatically control the gain of the first amplifier stage in a synchronized manner, and any bar code symbol represented by collected digitized scan data is decoded (i.e. read) during the laser beam scanning cycle.

Referring to FIG. 4A, a method will now be described for reading bar code symbols using the laser scanning bar code reader 100, described above, wherein the gain of the analog scan data signal processing stage in module 106, is automatically controlled in a synchronized manner, as the analog scan data signal is collected and processed, and digitized data signals are generated and processed by the SDGC module 109 during each laser beam scanning cycle.

As indicated in FIG. 4A, the process orchestrated by system controller 150 begins at the START Block. Then at Block A, the system controller 150 determines if a trigger event has occurred (i.e. whether or not trigger 104 has been manually depressed by the operator upon seeing an object in the laser scanning field and pointing the head portion of the housing towards the object). When the trigger event is detected at Block A, the system controller 150 enables, at Block B, the laser scanning module 105 (including the laser VLD 112, scanning mechanism and associated electronics and photo-electronics) to scan the object with a laser scanning beam generated by the VLD 112, and collect and buffer a pair of lines of scan data in buffers 160, representative of collected scan data from the laser scanned object during both laser scanning directions.

As shown in FIG. 4A, at Block C, the SDGC process of the present disclosure is carried out in an automatic manner, during each laser scanning cycle, to control the gain of the amplification stage of the light collection and detection module 106, at the beginning of each laser scanning cycle, and this value is stored and used only for this laser scanning cycle, and will be updated during the beginning of the next scanning cycle, as described in detail below with reference to FIGS. 4A through 5B.

As indicated at Block D in FIG. 4A, the decode processor 108 runs a decode algorithm on the captured lines of scan data buffered in the scan line data buffer 160. If at Block E, a bar code symbol is decoded, then at Block F, the produced symbol character data is transmitted to the host system, and the system controller returns to Block A.

If, however, at Block E in FIG. 4A a bar code symbol is not decoded, then the system controller 150 determines at Block G whether or not the maximum scan attempt threshold has been reached, and if not, then the system controller 150 returns to Block B, and resumes the flow as indicated. However, if at Block G, the system controller 150 determines that the maximum scan attempt threshold has been accomplished, then the system controller 150 proceeds to Block H and sends a Failure to Decode notification to the operator, and returns to Block A, as shown.

Figure 3B:
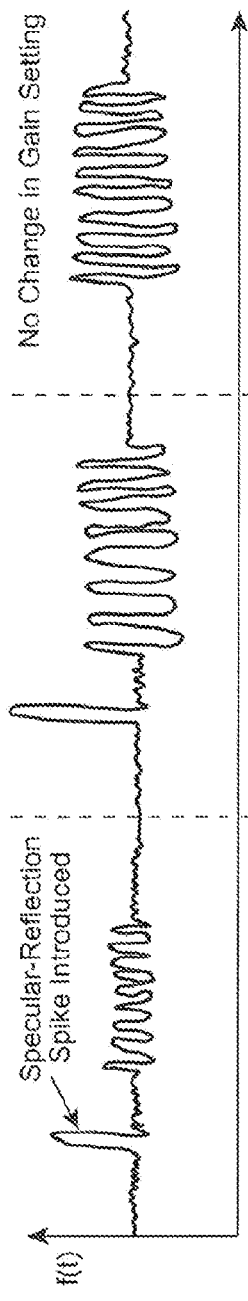
FIGS. 3B through 3D, when taken together, illustrate how the SDGC module controls the gain of a signal amplification stage processing a raw analog scan data signal, over three consecutive time windows (i.e. laser beam scanning cycles)
Figure 3C:
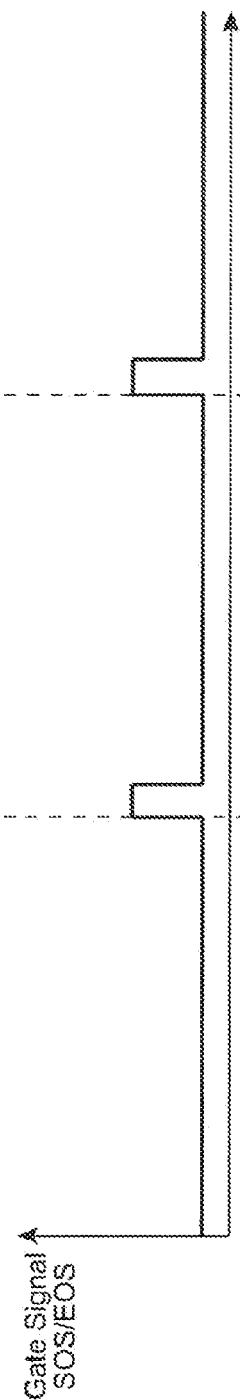
Figure 3D:
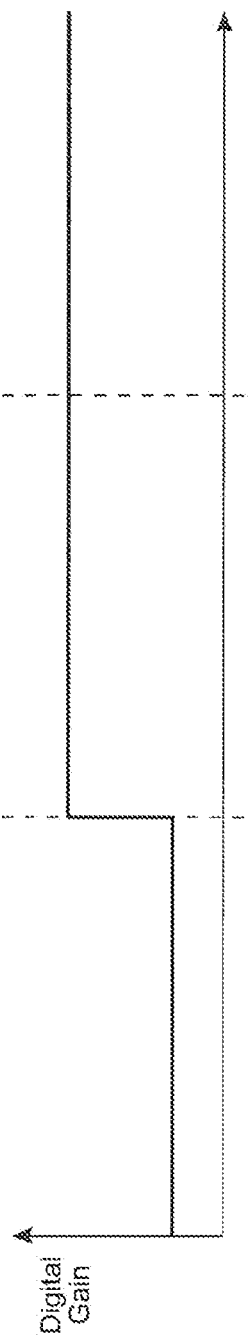
Figure 4B:
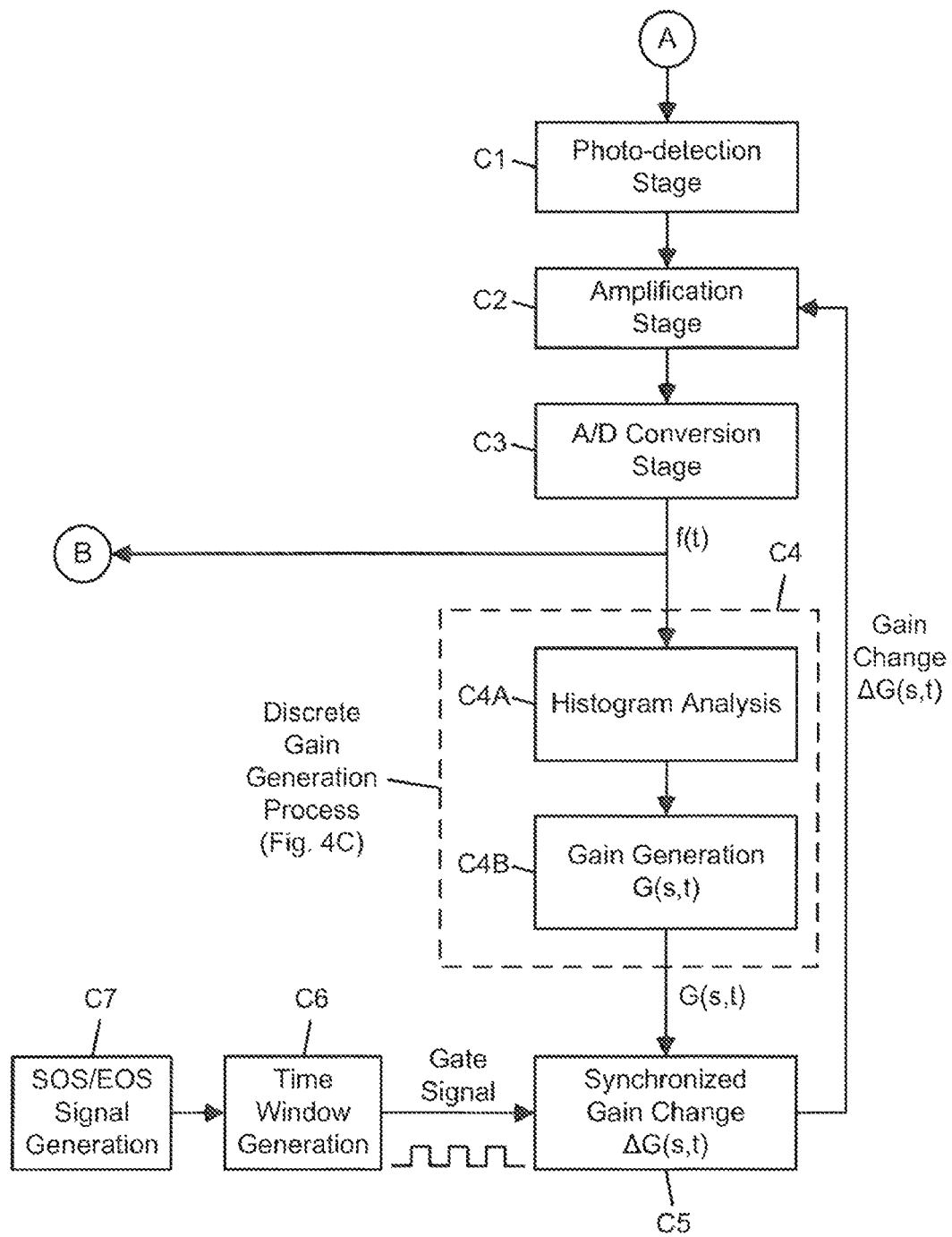
FIG. 4B is a flow chart describing the steps carried out during the synchronized digital gain control (SDGC) process of FIG. 3, where the analog scan data signal (i.e. analog barcode pattern signal) is processed, during a synchronized time window (i.e. between generation of the SOS and EOS signals during each scanning cycle)

Specification of Synchronized Digital Gain Control Process of the First Illustrative Embodiment FIG. 4B describes the steps carried out during the synchronized digital gain control (SDGC) process of FIG. 3, which is automatically and transparently called at Block C in the system control process described in FIG. 4A, at the beginning of each scanning cycle.

As indicated at Block C1 in FIG. 4B, the first step of the SDGC process begins at photo-detection stage (i.e. photo-detector) where collected return laser light is detected by the photo-detector and a corresponding analog scan data signal or analog barcode pattern signal is generated.

As indicated at Block C2 in FIG. 4B, the amplification stage amplifies the analog scan data signal, by the gain value determined by the SDGC module 109 during each scanning cycle.

As indicated at Block C3 in FIG. 4B, the A/D conversion stage 107B converts the amplified analog scan data signal, including the first derivative signal, into corresponding digital scan data signals, including the digital raw intensity data signal $f(t)$ and the digital first derivative data signal $f'(f)$, providing indications of the strength or magnitude in signal level transitions and other signal characteristics that might be useful during decode processing, as well as during the synchronized digital gain control process.

As indicated a Block C4 in FIG. 4B, a discrete gain calculation/estimation process is carried out at the beginning (i.e. start) of each scanning cycle (i.e. in response to detection of the SOS signal) using a two-step method, namely: performing a histogram analysis on the time-sampled digital intensity data signal $f(t)$ indicated at Block C4A; and generating a discrete gain value $G(s,t)$ for the amplification stage of the photo-collection and detection module 6, as indicated at Block C4B. In general, the discrete gain signal $G(s, t)$ is a function of the signal strength (e.g. intensity or amplitude), and timing window, t. The signal strength could be, but is not limited to, the first derivative signal, raw digital scan data signal, etc. The timing window t is generated by the SOS/EOS detector which can be implemented in different ways depending on the type of laser scanning system used. This ensures that gain change occurs only during the synchronized time window (i.e. when the gate timing signal does to a logical high value) so that the signal has constant gain during each scanning cycle (i.e. laser beam sweep).

Figure 4C:
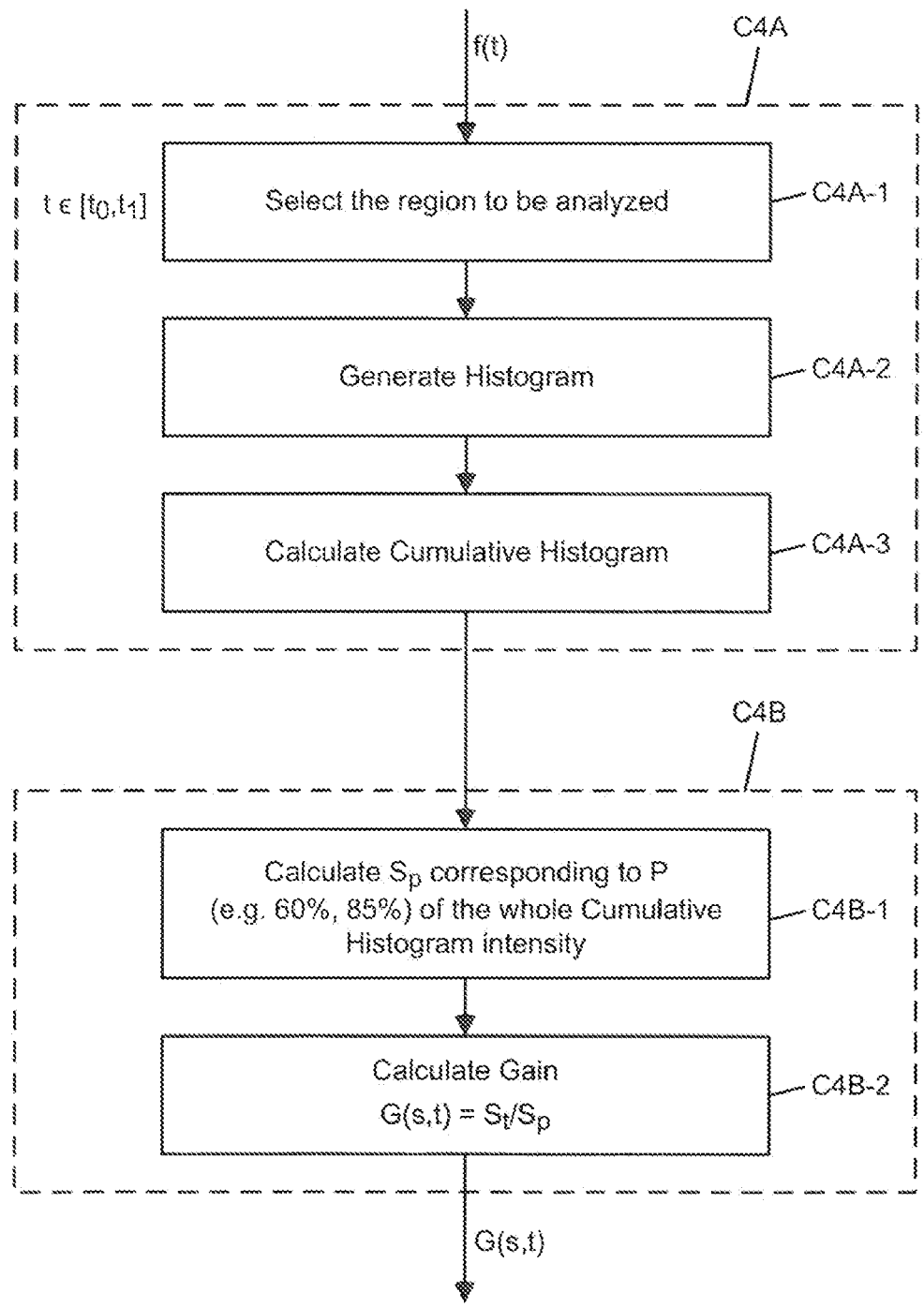
FIG. 4C is a flow chart describing a preferred method of processing the digitized scan data signal within the decode processor of FIG. 3, involving histogram analysis and gain calculation.

In FIG. 4C, the digital gain calculation/estimation process of the preferred embodiment is described in greater detail. As shown, this process comprises the following steps: at Block C4A-1, selecting a time region over which the sampled digital raw intensity data signal $f(t)$ is to be analyzed (e.g. from $t_1$ to $t_0$); at Block C4A-2, generate a histogram based on the region of the sampled digital raw scan data intensity signal $f(t)$ selected in Block C4A-1; at Block C4A-3, calculating a cumulative histogram based on the histogram generated in Block C4A-2; at Block C4B-1, calculating the current signal level $S(p)$ corresponding to the frequency of the signal level, p, observed over the selected time region (e.g. 60% or 85% of the whole intensity value); and at Block C4B-2, calculating the discrete gain value $G(s,t)$, for the current scanning cycle, using the following formula: $G(s,t)=S_t/S_p$ where $S_t$ is the target signal level, and $S_p$ is the current signal level corresponding to P (e.g. 60% or 85%) of the whole cumulative histogram. This process will be described in greater technical detail below with reference to FIGS. 5A and 5B.

As indicated at Block C4A-1 in FIG. 4C, a given digital raw intensity data signal $f(t)$ is sampled over a selected time region, extending from a start point a time t1, to an end point at time t2. The sampled digital raw intensity data signal $f(t)$ is buffered within the SDGC module for subsequent processing. The system can be configured so that the selected time region occurs over a certain area/region of the scan line (e.g. the left side of the scan line, the right side of the scan line, or in the center region of the scan line).

Figure 5A:
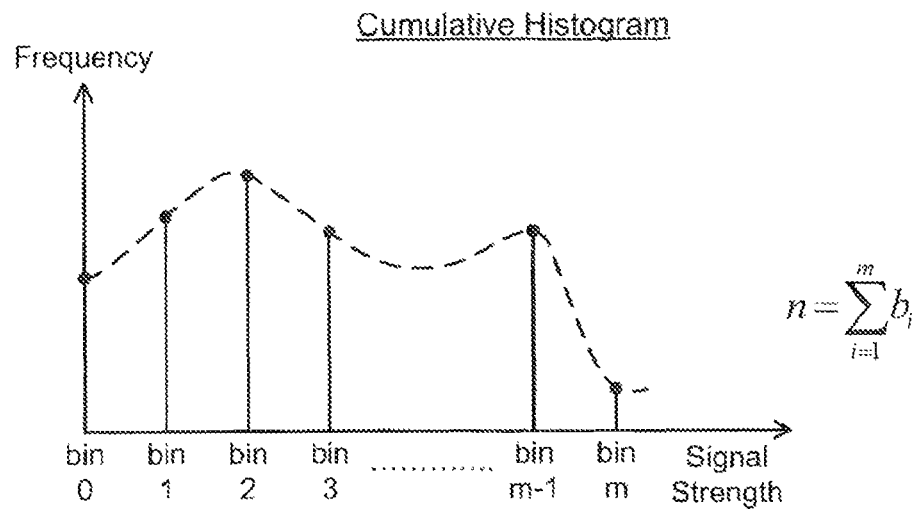
FIG. 5A is a schematic representation of a cumulative histogram of sampled signal strength values within the digital scan data signal.

As indicated at Block C4A-2 in FIG. 4C, a histogram is calculated for the sampling scanning cycle, by classifying each sample point in the sampled digital raw intensity data signal $f(t)$, into one or M possible bins (i.e. storage locations), where each bin represents a particular signal level or range of signal level of the digital raw intensity data signal $f'(t)$, as illustrated in FIG. 5A. For the time interval [t1, t2], the frequency of the signal level associated with each bin is calculated to provide the histogram shown in FIG. 5A. Notably, this histogram analysis removes the effects of strong return laser signals having great differences in signal intensity, produced when laser scanning targets with surface areas (i) having specular-type reflection characteristics, and/or (ii) located at different distances from the laser scanner, etc.

Figure 5B:
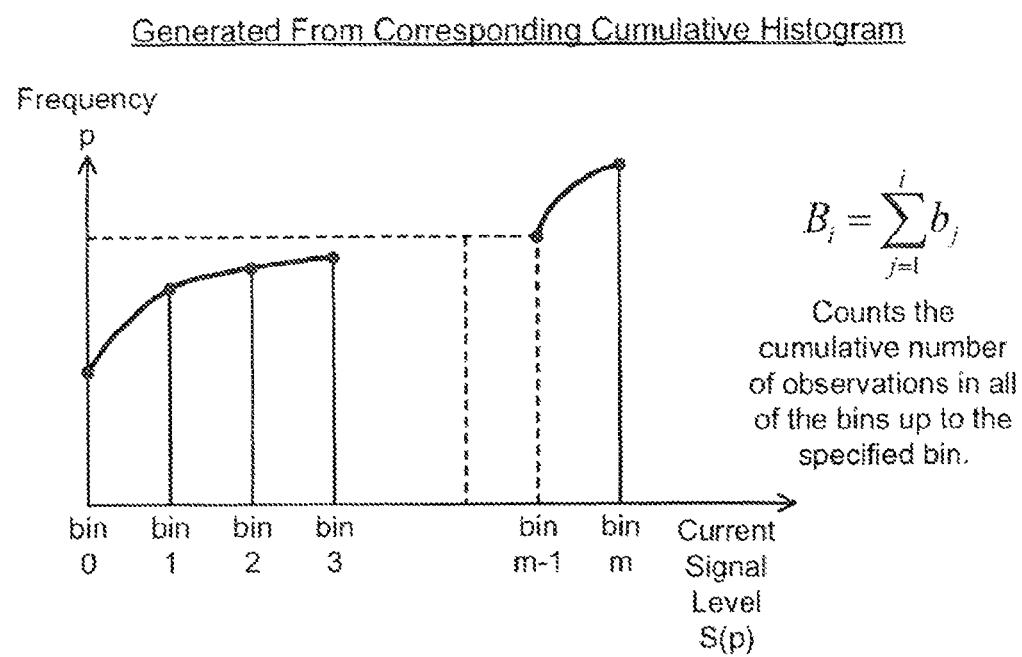
FIG. 5B is a schematic representation generated from a corresponding cumulative histogram, plotting frequency versus current signal level within the digital scan data signal.

As indicated at Block C4A-3 in FIG. 4C, a cumulative histogram is calculated using the corresponding histogram by counting the cumulative number of observed signal levels (i.e. observations on $f(t)$) in all of the bins up to the specified bin, as illustrated in FIG. 5B.

As indicated at Block C4B-1 in FIG. 4C, the current signal level $S_p$ (or $S(p)$) corresponding to a percentage p (e.g. 60% or 85%) of the whole cumulative histogram, observed over the selected time region, is calculated, as illustrated in FIG. 5B.

Then, as indicated at Block C4B-2 in FIG. 4C, a discrete gain value $G(s,t)$ is calculated for the current scanning cycle, using the following formula: $G(s,t)=S_t/S_p$ where $S_t$ is the target signal level, and $S_p$ is the current signal level corresponding to a percentage P (e.g. 60% or 85%) of the whole cumulative histogram.

In general, the target signal level $S_t$ is the signal level at which system performance is optimized, and is set prior to system operation. Typically, this value is determined from experimentation, and while it will be dependent upon the stage at which SDGC is applied, this target value should remain constant during a long period of operation of the system. Such experimentation will typically take place during system design, but may be carried out during a diagnostic procedure during which $S_t$ is determined experimentally, and then programmed into the SDGC module prior to system operation. Notably, the units of measure of $S_t$ will depend on the signal processing stage where SDGC is applied. However, regardless of whether SGDC is applied to the preamplifier stage in the photo-collection and detection module, or derivative or other amplification stages in the analog signal processing/digitizing module, the $S_t$ value typically will be chosen as a percentage of the maximum possible signal swing that such signal amplification/gain circuitry can operate, without going into a state of saturation or otherwise generating undesired non-linear signal distortion due to excessive swings in voltages that maintain the operation of the amplification circuitry.

As indicated in the SDGC process of FIG. 4B, the discrete gain value G(s, t) calculated in Block C4 is provided to Block C5, where a synchronized gain change value ΔG(s, t) is computed, for the current time window (i.e. laser beam scanning cycle), determined by time window block C6, driven by SOS/EOS signal generation block C7, as described above. The synchronized discrete gain change value ΔG(s,t) (i.e. a digital numerical value) is then transmitted to the digitally-controlled analog amplification stage at Block C2, to instantly change the gain of this stage to a new gain value determined by the synchronized discrete gain change value ΔG(s,t). Thus, by selecting the target signal level $S_t$ at an optimum value of system operation, the SDGC module automatically computes and applies the synchronized discrete gain change value ΔG(s, t), during each scanning cycle (i.e. time window) so that the output signal level from the digitally-controlled analog amplification stage closely approaches the target signal level $S_t$ and system performance is optimized.

Having described the operation of the SDGC process during each scanning cycle, it now will be helpful to refer to FIGS. 3B through 3D and describe how an analog scan data signal is processed by a stage of signal processing circuitry having its gain controlled by the SDGC module 109 over three consecutive time windows (i.e. scanning cycles).

As shown in FIGS. 3B, 3C and 3D, during the first (initial) scanning cycle, scan line N−1 is generated and associated scan data collected. As shown, the SOS signal is logically low, the gain is maintained at a first constant level, and the scan data signal f(t) (or f'(t)) is amplified by the first gain level.

During the second scanning cycle, scan line N is generated and associated scan data collected. As shown, the SOS signal transitions from a logically low to logically high value (indicating a new scanning cycle), the gain is increased at a second constant level, and the scan data signal f(t) (or f(t)) is amplified by the second gain level.

Then, during the third scanning cycle, scan line N+1 is generated and associated scan data collected. As shown, the SOS signal transitions from a logically low to logically high value (indicating a new scanning cycle), the gain is maintained constant at the second gain level, and the scan data signal f(t) (or f'(t)) is amplified by the same second gain level.

Thereafter, the SDGC process repeats itself automatically, each and every scanning cycle, in a manner transparent to the system user, to maintain the intensity of processed analog scan data signals relatively constant before conversion into corresponding digital data signals.

Figure 6A:
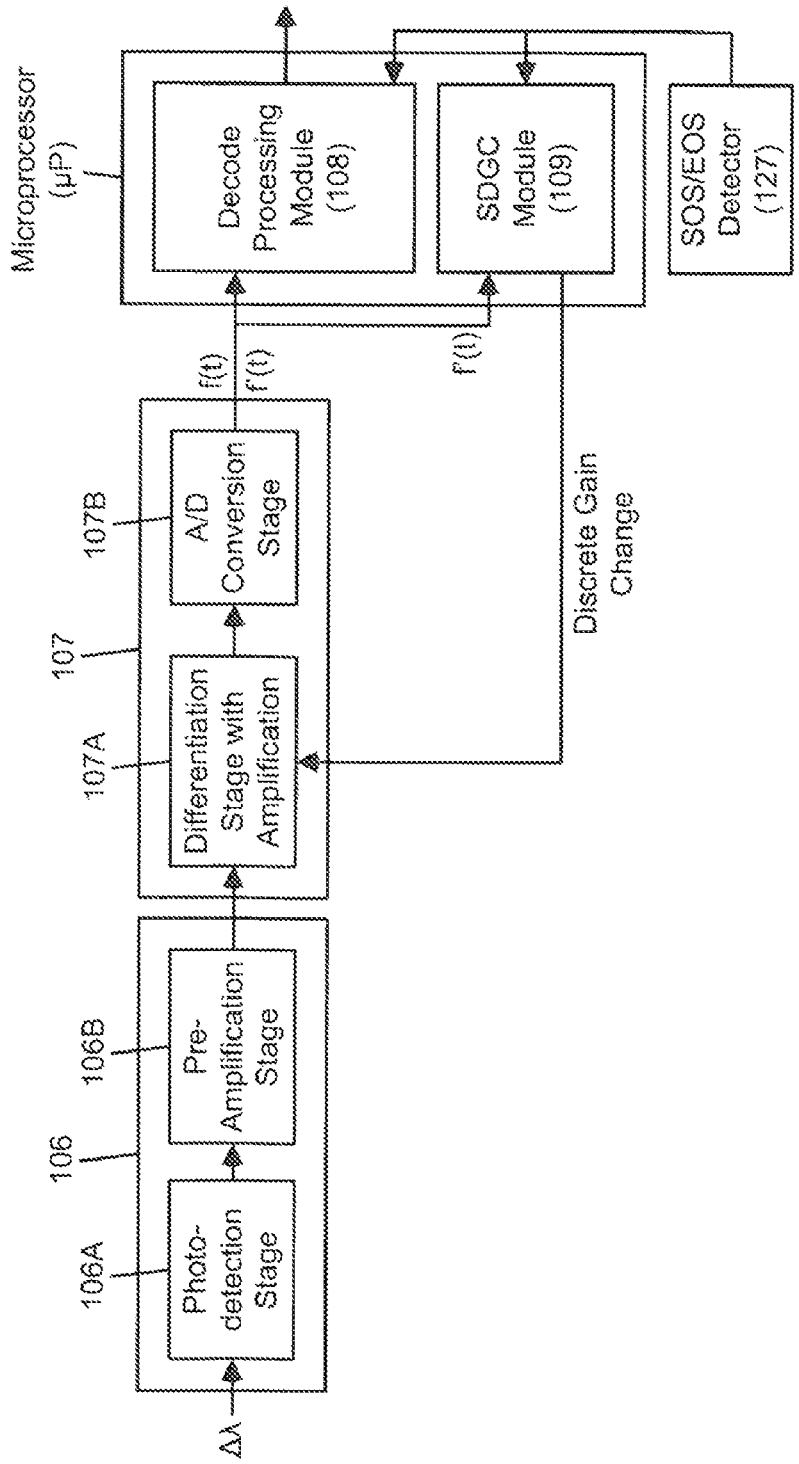
FIG. 6A is a schematic block diagram describing the major system components of the laser scanning bar code symbol reading system illustrated in FIG. 1, showing the primary stages of a second illustrative embodiment of the synchronized digital gain control (SDGC) subsystem and process of the present disclosure, including (i) a light collection and photo-detection module having a photo-detection stage and a pre-amplification stage, and (ii) an analog scan data processing/digitizer module having a differentiation stage with digitally-controlled pre-amplification controlled by its gain setting, and an A/D signal conversion stage.

Specification of the Second Illustrative Embodiment of the Synchronized Digital Gain Control (SDGC) Process of the Present Disclosure FIG. 6A describes a second illustrative embodiment of a synchronized digital gain control (SDGC) subsystem and process supported in the laser scanning bar code symbol reading system of FIG. 1. As shown, the decode processor 108 and SDGC module 109 are realized by a programmed microprocessor and associated memory architecture, and both modules receive SOS and EOS timing signals from the SOS/EOS detector 127 which can be realized using Hall-effect sensor and one or more permanent magnets embedded in the scanner rotor, or other techniques well known in the art.

As shown in FIG. 6A, the photo-collection and photo-detection module 106 includes at least a photo-detection stage 106A and an amplification stage 106B. Also, the analog scan data signal processor/digitizer 107 includes a differentiation stage 107A with digitally-controlled pre-amplification determined by its gain setting, and an A/D conversion stage 107B for A/D signal conversion. As shown, the differentiation stage 107A periodically receives a discrete gain change signal (i.e. digital control data) AG(S, t) from the microprocessor-implemented SDGC module 109. The rate at which the module 107 receives discrete gain control updates AG(S, t) depends on the frequency of the laser scanning mechanism (e.g. flipper mechanism, rotating polygon, etc). The SDGC module 109 updates the gain of the differentiation stage once every laser beam scanning cycle, using the synchronized digital gain control (SDGC) process of FIGS. 7B and 7C, which is called during the main control process shown in FIG. 7A, carried out in the laser scanning bar code symbol reading system 1 shown in FIG. 1, to be described herein below. In response to a triggering event (i.e. manually pulling trigger 104 to its first position), the system controller 150 enables subsystem 219 to generate and project a cone-like visible aiming beam 221 within the laser scanning field 115 of the system. After the aiming beam 221 is aligned with the bar code symbol to be scanned, the user pulls the trigger switch 104 to its second position. In response, the system controller 150 enables the laser scanning module 105 to generate and project a laser scanning beam through the light transmission window 103, and across the laser scanning field external to the hand-supportable housing, for scanning an object in the scanning field. The laser scanning beam is generated by laser beam source 112 in response to control signals generated by the system controller 150. The scanning element (i.e. mechanism) 134 begins to repeatedly scan the selected laser beam across a code symbol residing on an object in the laser scanning field 115. Then, the light collection optics 106 collects light reflected/scattered from scanned code symbols on the object in the scanning field, and the photo-detector (106) automatically detects the intensity of collected light (i.e. photonic energy) and generates an analog scan data signal (i.e. bar code pattern signal) corresponding to the light intensity detected during scanning operations. The differentiation stage 107A and filtering stage 107C process the analog scan data signals, and the A/D conversion module 107B converts the processed analog scan data signals into digitized data signals, including digital raw intensity signal f(t) and the first digital derivative data signal f'(t). While both the digital raw intensity signal f(t) and the derivative first derivative signal f'(t) are typically transmitted to the programmed decode processor 108 for use during decode processing, only the digital first derivative data signal f'(t) is transmitted to the SDGC module 109 in this illustrative embodiment. In other illustrative embodiments, whereas, both the digital raw intensity signal f(t) and the digital first derivative data signal f'(t) can be transmitted to the SDGC module 109 for use in generating gain control data signals.

The SOS/EOS detector 127 generates a SOS signal upon detecting the start of the first and each subsequent laser beam scanning cycle, and these SOS signals are transmitted to the SDGC module 109 and the programmed decode processor 108. The SDGC module 109 uses the SOS signal from detector 127 and the digital derivative data signal f'(t) from processor/digitizer 107 to generate digital control data signals for transmission to the digitally-controlled analog signal differentiation stage 107A within the analog scan data signal processor/digitizer 107, to control the gain thereof, during a corresponding scanning cycle, in accordance with the principles of the present disclosure, to be described in greater detail herein. This process is repeated each cycle to control the gain of the digitally-controlled differentiation stage 107A in scan data signal processor/digitizer module 107, during laser scanning operations. Also, the programmed decode processor 108 decode processes digitized data signals, and generates symbol character data representative of each bar code symbol scanned by the laser scanning beam. Symbol character data corresponding to the bar codes read by the decoder 108 is then transmitted to the host system via the I/O communication interface 140 which may support either a wired and/or wireless communication link, well known in the art. During laser scanning operations, the system controller 150 automatically generates the necessary control signals for controlling operations within the hand-supportable laser scanning bar code symbol reading system.

Figure 7A:
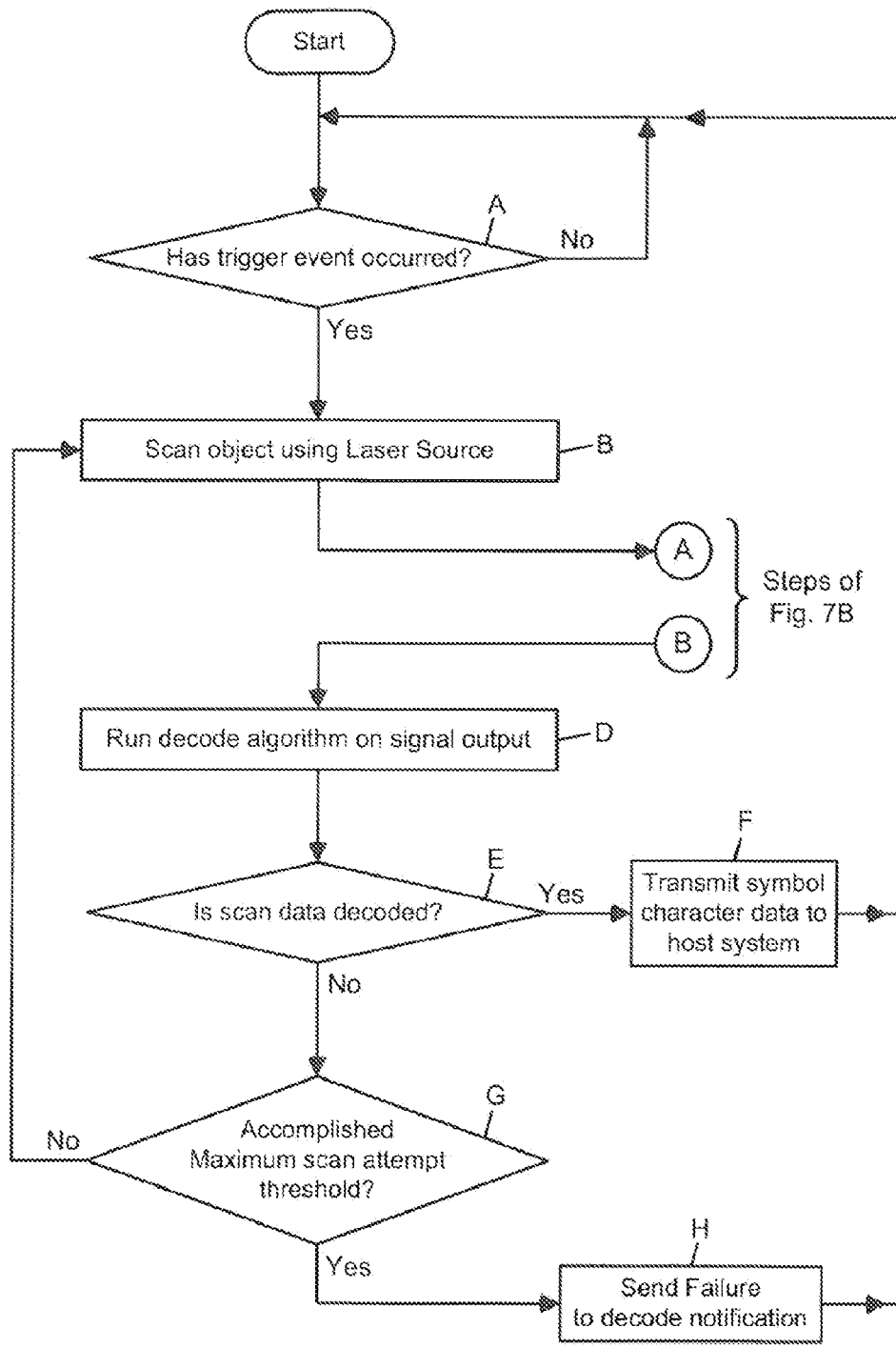
FIG. 7A is a flow chart describing the primary steps carried out in the laser scanning bar code symbol reading system of FIG. 6, wherein upon detecting a trigger event in the system, the bar code symbol is automatically laser scanned, scan data captured and processed to automatically control the gain of the first amplifier stage in a synchronized manner, and any bar code symbol represented by collected digitized scan data decoded (i.e. read) during a given scanning cycle.

Referring to FIG. 7A, a method will now be described for reading bar code symbols using the laser scanning bar code reader 100, wherein the gain of the differentiation stage in the analog scan data signal processor/digitizer 107, is automatically controlled in a synchronized manner, as the analog scan data signal is collected and processed, and digitized scan data is generated and processed by the SDGC module 109 during each laser beam scanning cycle.

As indicated in FIG. 7A, the process orchestrated by system controller 150 begins at the START Block. Then at Block A, the system controller 150 determines if a trigger event has occurred (i.e. whether or not trigger 104 has been manually depressed by the operator upon seeing an object in the laser scanning field and pointing the head portion of the housing towards the object). When the trigger event is detected at Block A, the system controller 150 enables, at Block B, the laser scanning module 105 (including the laser VLD 112, scanning mechanism and associated electronics and photo-electronics) to scan the object with a laser scanning beam generated by the VLD 112, and collect and buffer a pair of lines of scan data in buffers 160, representative of collected scan data from the laser scanned object during both laser scanning directions.

As shown in FIG. 7A, at Block C, the SDGC process of the present disclosure is carried out in an automatic manner, during each laser scanning cycle, to control the gain of the signal differentiation stage 107A of the analog scan data signal processor/digitizer module 107, at the beginning of each laser scanning cycle, and this value is stored and used only for this laser scanning cycle, and will be updated during the beginning of the next scanning cycle, as will be described in detail below with reference to FIG. 7A.

As indicated at Block D in FIG. 4A, the decode processor 108 runs a decode algorithm on the captured lines of scan data buffered in the scan line data buffer 160. If at Block E, a bar code symbol is decoded, then at Block F, the produced symbol character data is transmitted to the host system, and the system controller returns to Block A.

If, however, at Block E in FIG. 7A a bar code symbol is not decoded, then the system controller 150 determines at Block G whether or not the maximum scan attempt threshold has been reached, and if not, then the system controller 150 returns to Block B, and resumes the flow as indicated. However, if at Block G, the system controller 150 determines that the maximum scan attempt threshold has been accomplished, then the system controller 150 proceeds to Block H and sends a Failure to Decode notification to the operator, and returns to Block A, as shown.

Figure 7B:
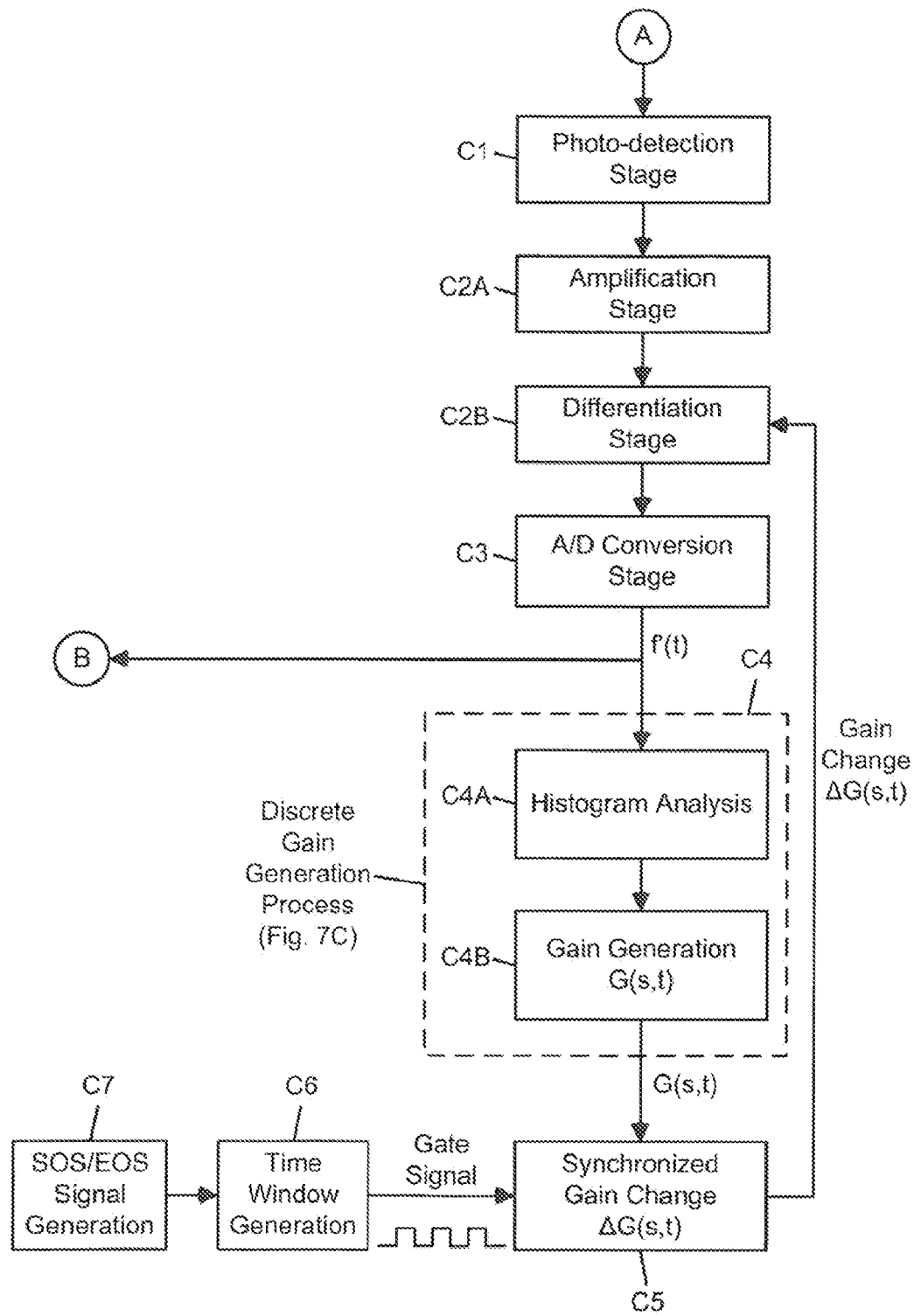
FIG. 7B is a flow chart describing the steps carried out during the synchronized digital gain control (SDGC) process illustrated in FIG. 6, where the analog scan data signal (i.e. analog barcode pattern signal) is processed, during a synchronized time window defined by the generation of start of scan (SOS) signals during each laser beam scanning cycle.

Specification of Synchronized Digital Gain Control Process Carried Out in the Second Illustrative Embodiment FIG. 7B describes the steps carried out during the synchronized digital gain control (SDGC) process of FIG. 3, which is automatically and transparently called at Block C in the system control process described in FIG. 7A, at the beginning of each scanning cycle.

As indicated at Block C1 in FIG. 7B, the first step of the SDGC process begins at photo-detection stage (i.e. photo-detector) where collected return laser light is detected by the photo-detector and a corresponding analog scan data signal or analog barcode pattern signal is generated.

As indicated at Block C2 in FIG. 7B, the amplification stage amplifies the analog scan data signal, by the gain value determined by the SDGC module 109 during each scanning cycle.

As indicated at Block C3 in FIG. 7B, the A/D conversion stage 107B converts the amplified analog scan data signal, including the first derivative signal, into corresponding digital scan data signals, including the digital raw intensity data signal f(t), and the digital first derivative data signal f' (t) providing indications of the strength or magnitude in signal level transitions and other signal characteristics that might be useful during decode processing, as well as during the synchronized digital gain control process.

As indicated a Block C4 in FIG. 7B, a discrete gain calculation/estimation process is carried out at the beginning (i.e. start) of each scanning cycle (i.e. in response to detection of the SOS signal) using a two-step method, namely: performing a histogram analysis on the time-sampled digital first derivative data signal f' (t) indicated at Block C4A; and generating a discrete gain value $G(s,t)$ for the differentiation stage 107A of the processor/digitizer module 107, as indicated at Block C4B. In general, the discrete gain signal $G(s, t)$ is a function of the signal strength (e.g. intensity or amplitude), and timing window, t. The signal strength could be provided by the digital first derivative signal f' (t) as in FIG. 6A, the digital raw intensity data signal f(t) as in FIG. 3A, or a combination thereof in an alternative embodiment. The timing window t is generated by the SOS/EOS detector which can be implemented in different ways depending on the type of laser scanning system used. This ensures that gain change occurs only during the synchronized time window (i.e. when the gate timing signal does to a logical high value) so that the signal has constant gain during each scanning cycle (i.e. laser beam sweep).

Figure 7C:
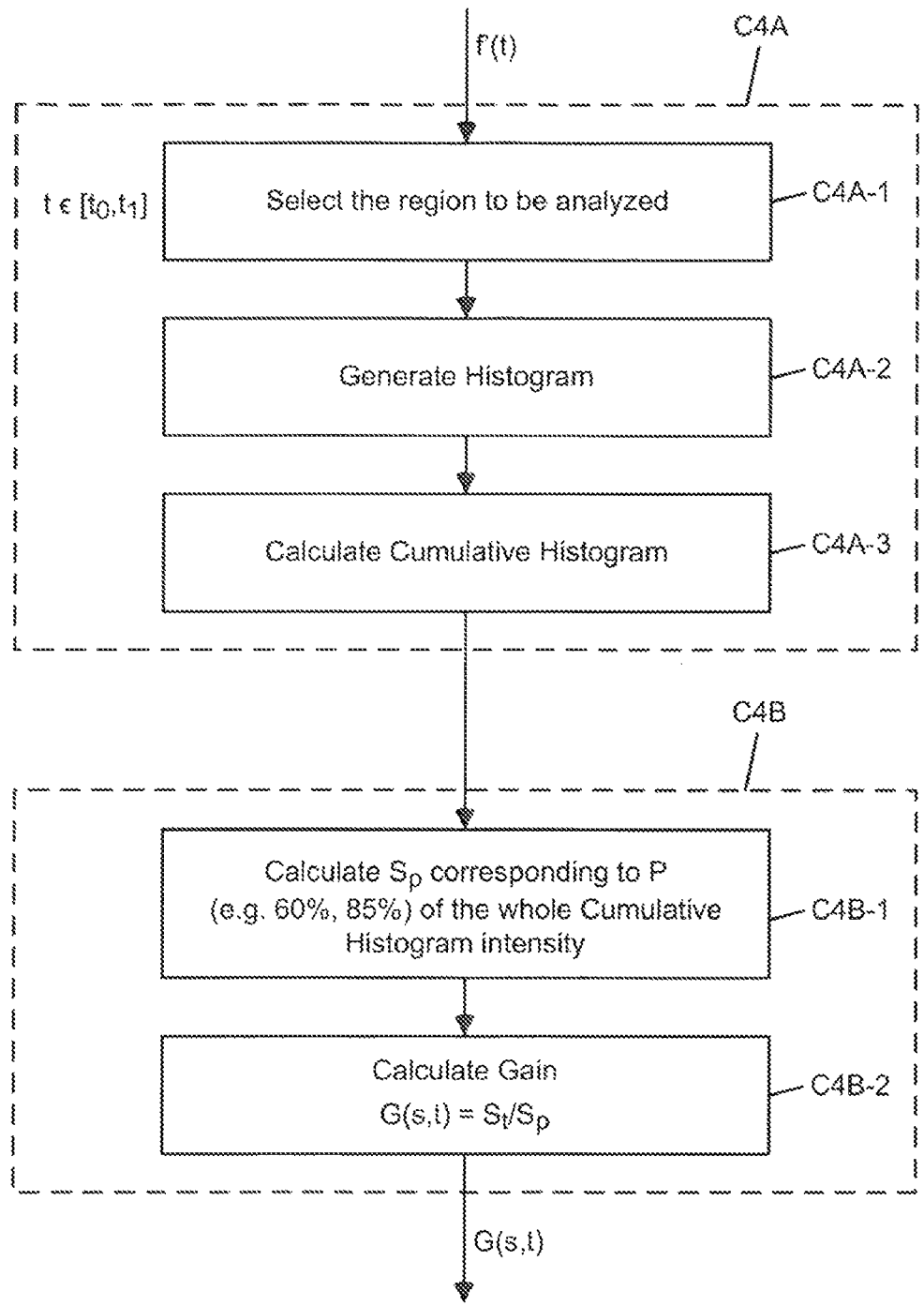
FIG. 7C is a flow chart describing a preferred method of processing the digitized scan data signal within the programmed decode processor shown in FIG. 6, involving histogram analysis and gain calculation.

In FIG. 7C, the digital gain calculation/estimation process of the preferred embodiment is described in greater detail, as comprising the following steps: at Block C4A-1, selecting a time region over which the sampled digital first derivative data signal f'(t) is to be analyzed (e.g. from t1 to t0); at Block C4A-2, generate a histogram based on the region of the sampled digital first derivative data signal f'(t) selected in Block C4A-1; at Block C4A-3, calculating a cumulative histogram based on the histogram generated in Block C4A-2; at Block C4B-1, calculating the current signal level S(p) as p (e.g. 60% or 85%) of the whole cumulative histogram intensity value; and at Block C4B-2, calculating the discrete gain value G(s,t), for the current scanning cycle, using the following formula: $G(s,t)=S_t/S_p$ where $S_t$ is the target signal level, and $S_p$ is the current signal level corresponding to p (e.g. 60% or 85%) of the whole cumulative histogram intensity. This process has been described in great technical detail above with reference to FIGS. 5A and 5B, and will not be repeated to avoid redundancy.

As indicated in the SDGC process of FIG. 7B, the discrete gain value G(s, t) calculated in Block C4 is provided to Block C5, where a synchronized gain change value $\Delta G(s, t)$ is computed, for the current time window (i.e. laser beam scanning cycle), determined by time window block C6, driven by SOS/EOS signal generation block C7, as described above. The synchronized discrete gain change value $\Delta G(s,t)$ (i.e. a digital numerical value) is then transmitted to the digitally-controlled analog amplification stage at Block C2, to instantly change the gain of this stage to a new gain value determined by the synchronized discrete gain change value $\Delta G(s,t)$. Thus, by selecting the target signal level $S_t$ at an optimum value of system operation, the SDGC module automatically computes and applies the synchronized discrete gain change value $\Delta G(s, t)$, during each scanning cycle (i.e. time window) so that the output signal level from the digitally-controlled analog amplification stage closely approaches the target signal level $S_t$ and system performance is optimized.

The SDGC process describes above operates in a manner similar to that described in connection with the first illustrative embodiment, and illustrated in FIGS. 3B through 3D.

This SDGC process repeats itself automatically, each and every scanning cycle, in a manner transparent to the system user, to maintain the intensity of processed analog scan data signals relatively constant before conversion into corresponding digital data signals.

Figure 8A:
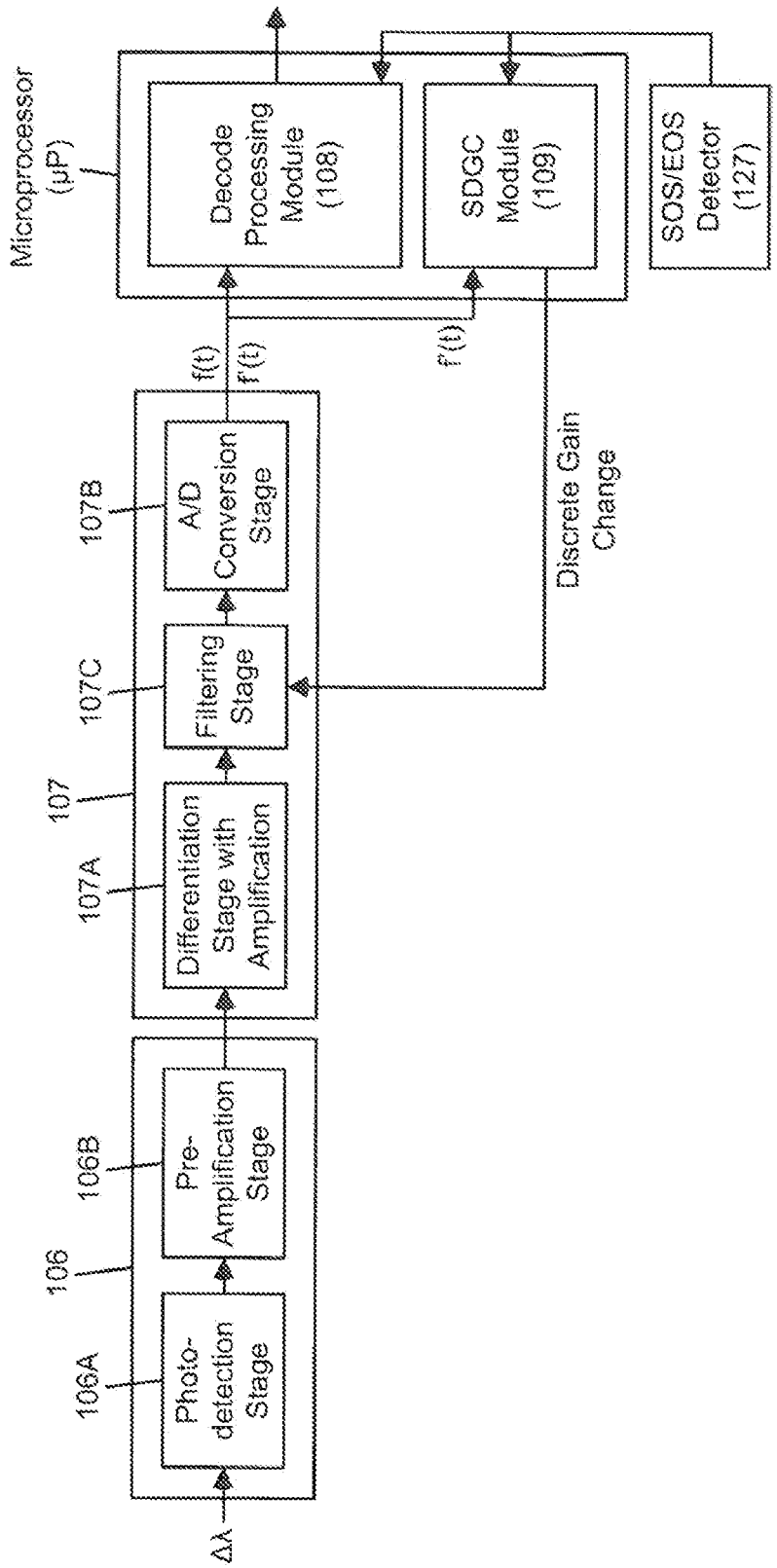
FIG. 8A is a schematic block diagram describing the major system components of the laser scanning bar code symbol reading system illustrated in FIG. 1, showing the primary stages of a third illustrative embodiment of the synchronized digital gain control (SDGC) subsystem and process of the present disclosure, including (i) a light collection and photo-detection module having a photo-detection stage and a pre-amplification stage, and (ii) an analog scan data processing/digitizer module having a differentiation stage, a filtering stage with digitally-controlled amplification controlled by its gain setting, and an A/D signal conversion stage.

Specification of the Third Illustrative Embodiment of the Synchronized Digital Gain Control (SDGC) Process of the Present Disclosure FIG. 8A describes a third illustrative embodiment of a synchronized digital gain control (SDGC) subsystem and process supported in the laser scanning bar code symbol reading system of FIG. 1. As shown, the programmed decode processor module 108 and SDGC module 109 are realized by a programmed microprocessor and associated memory architecture, and both modules receive SOS and EOS timing signals from the SOS/EOS detector 127 which can be realized using Hall-effect sensor and one or more permanent magnets embedded in the scanner rotor, or other techniques well known in the art.

As shown in FIG. 8A, the photo-collection and photo-detection module 106 includes at least a photo-detection stage 106A and an amplification stage 106B. Also, the analog scan data signal processor/digitizer 107 includes a differentiation stage 107A, a filtering stage 107C with digitally-controlled pre-amplification characterized by its gain setting, and an A/D signal conversion stage 107B. As shown, the filtering stage 107C periodically receives a discrete gain change signal (i.e. digital control data) AG(S, t) from the microprocessor-implemented SDGC module 109. The rate at which the module 107 receives discrete gain control AG(S, t) updates depends on the frequency of the laser scanning mechanism (e.g. flipper mechanism, rotating polygon, etc). The SDGC module 109 updates the gain of the differentiation stage once every laser beam scanning cycle, using the synchronized digital gain control (SDGC) process of FIGS. 9B and 9C. The SDGC process is called during the main control process shown in FIG. 9A, which is carried out in the laser scanning bar code symbol reading system 1 shown in FIG. 1, to be described herein below.

In response to a triggering event (i.e. manually pulling trigger 104 to its first position), the system controller 150 enables subsystem 219 to generate and project a cone-like visible aiming beam 221 within the laser scanning field 115 of the system. After the aiming beam 221 is aligned with the bar code symbol to be scanned, the user pulls the trigger switch 104 to its second position. In response, the system controller 150 enables the laser scanning module 105 to generate and project a laser scanning beam through the light transmission window 103, and across the laser scanning field external to the hand-supportable housing, for scanning an object in the scanning field. The laser scanning beam is generated by laser beam source 112 in response to control signals generated by the system controller 150. The scanning element (i.e. mechanism) 134 begins to repeatedly scan the selected laser beam across a code symbol residing on an object in the laser scanning field 115. Then, the light collection optics 106 collects light reflected/scattered from scanned code symbols on the object in the scanning field, and the photo-detector in the photo-detection stage 106A automatically detects the intensity of collected light (i.e. photonic energy) and pre-amplification stage 106B generates an analog scan data signal (i.e. bar code pattern signal) corresponding to the light intensity detected during scanning operations. The differentiation stage 107A and filtering stage 107C process the analog scan data signals, and the A/D conversion module 107B converts the processed analog scan data signals into digitized data signals, including the digital raw intensity data signal f(t) and the digital first derivative data signal f'(t). While both the digital raw intensity data signal f(t) and the first derivative data signals f'(t) are transmitted to the programmed decode processor 108 for use in decode processing, only the digital first derivative data signal f'(t) is transmitted to the SDGC module 109 for processing. In other alternative embodiments, however, both the digital raw intensity signal f(t) and the first derivative data signal f'(t) can be transmitted to the SDGC module 109 for use in generating gain control data signals.

The SOS/EOS detector 127 generates a SOS signal upon detecting the start of the first and each subsequent laser beam scanning cycle, and these SOS signals are transmitted to the SDGC module 109 and the programmed decode processor 108. The SDGC module 109 uses the SOS signal from detector 127 and digital data signal from processor/digitizer 107 to generate digital control data signals for transmission to the digitally-controlled analog signal filtering stage within the analog scan data signal processor/digitizer 107, to control the gain thereof, during a corresponding scanning cycle, in accordance with the principles of the present disclosure, to be described in greater detail herein. This process is repeated each cycle to control the gain of the filtering stage in processor/digitizer 107. Also, the programmed decode processor 108 decode processes digitized data signals, and generates symbol character data representative of each bar code symbol scanned by the laser scanning beam. Symbol character data corresponding to the bar codes read by the decoder 108 is then transmitted to the host system via the I/O communication interface 140 which may support either a wired and/or wireless communication link, well known in the art. During laser scanning operations, the system controller 150 automatically generates the necessary control signals for controlling operations within the hand-supportable laser scanning bar code symbol reading system.

Figure 9A:
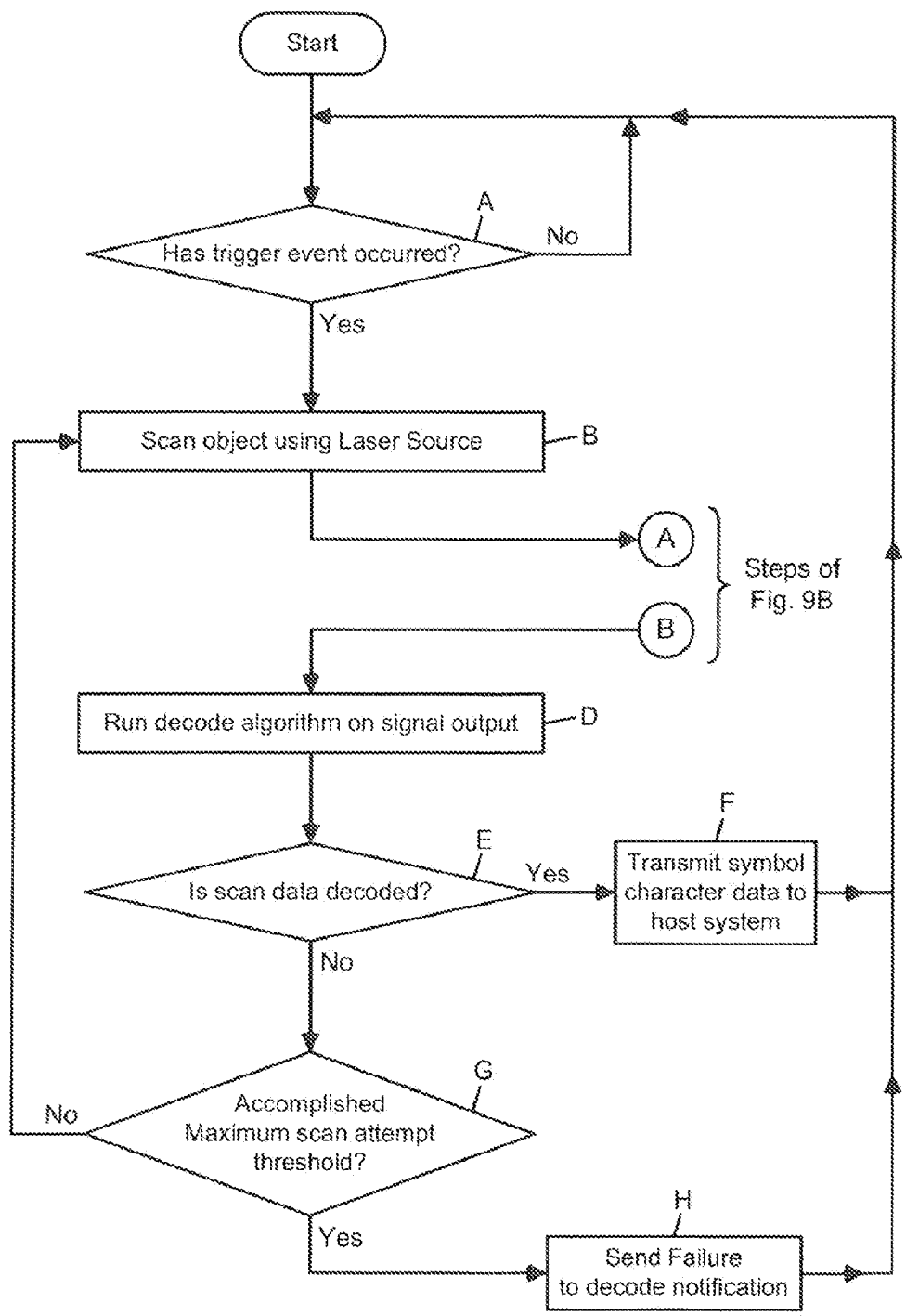
FIG. 9A is a flow chart describing the primary steps carried out in the laser scanning bar code symbol reading system of FIG. 8, wherein upon detecting a trigger event in the system, the bar code symbol is automatically laser scanned, scan data captured and processed to automatically control the gain of the first amplifier stage in a synchronized manner, and any bar code symbol represented by collected digitized scan data decoded (i.e. read) during a given scanning cycle.

Referring to FIG. 9A, a method will now be described for reading bar code symbols using the laser scanning bar code reader 100, wherein the gain of an analog signal filtering in the analog scan data signal processor/digitizer 107, is automatically controlled in a synchronized manner, as the analog scan data signal is collected and processed, and digitized scan data is generated and processed by the SDGC module 109 during each laser beam scanning cycle.

As indicated in FIG. 9A, the process orchestrated by system controller 150 begins at the START Block. Then at Block A, the system controller 150 determines if a trigger event has occurred (i.e. whether or not trigger 104 has been manually depressed by the operator upon seeing an object in the laser scanning field and pointing the head portion of the housing towards the object). When the trigger event is detected at Block A, the system controller 150 enables, at Block B, the laser scanning module 105 (including the laser VLD 112, scanning mechanism and associated electronics and photo-electronics) to scan the object with a laser scanning beam generated by the VLD 112, and collect and buffer a pair of lines of scan data in buffers 160, representative of collected scan data from the laser scanned object during both laser scanning directions.

As shown in FIG. 9A, at Block C, the SDGC process of the present disclosure is carried out in an automatic manner, during each laser scanning cycle, to control the gain of the amplification stage of the light collection and detection module 106, at the beginning of each laser scanning cycle, and this value is stored and used only for this laser scanning cycle, and will be updated during the beginning of the next scanning cycle, as will be described in detail below with reference to FIG. 9A.

As indicated at Block D in FIG. 9A, the decode processor 108 runs a decode algorithm on the captured lines of scan data buffered in the scan line data buffer 160. If at Block E, a bar code symbol is decoded, then at Block F, the produced symbol character data is transmitted to the host system, and the system controller returns to Block A.

If, however, at Block E in FIG. 9A a bar code symbol is not decoded, then the system controller 150 determines at Block G whether or not the maximum scan attempt threshold has been reached, and if not, then the system controller 150 returns to Block B, and resumes the flow as indicated. However, if at Block G, the system controller 150 determines that the maximum scan attempt threshold has been accomplished, then the system controller 150 proceeds to Block H and sends a Failure to Decode notification to the operator, and returns to Block A, as shown.

Figure 9B:
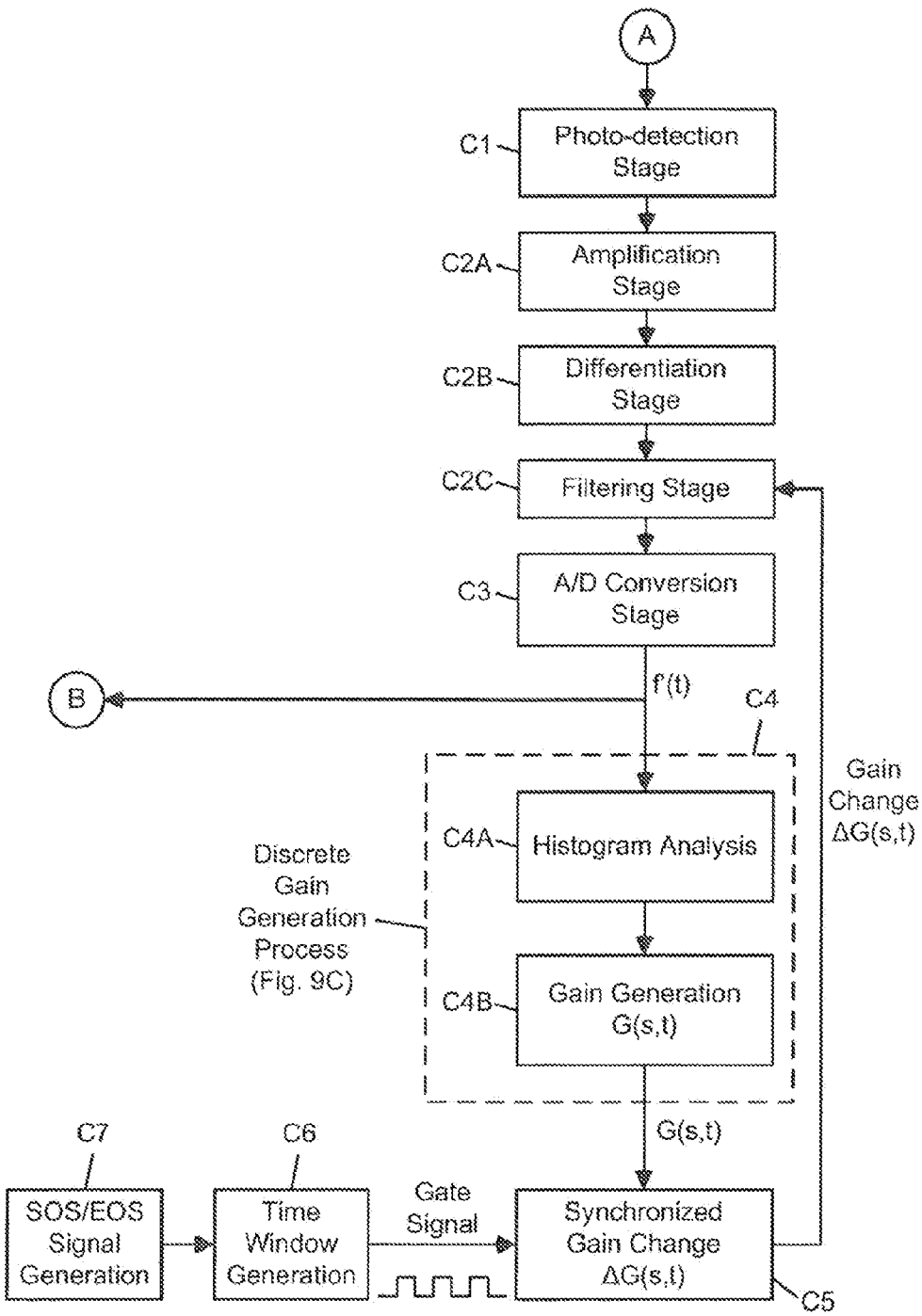
FIG. 9B is a flow chart describing the steps carried out during the synchronized digital gain control (SDGC) process illustrated in FIG. 8, where the analog scan data signal (i.e. analog barcode pattern signal) is processed, during a synchronized time window defined by the generation of start of scan (SOS) signals during each scanning cycle.

Specification of Synchronized Digital Gain Control Process of the Third Illustrative Embodiment FIG. 9B describes the steps carried out during the synchronized digital gain control (SDGC) process of FIG. 8, which is automatically and transparently called at Block C in the system control process described in FIG. 9A, at the beginning of each scanning cycle.

As indicated at Block C1 in FIG. 9B, the first step of the SDGC process begins at photo-detection stage (i.e. photo-detector) where collected return laser light is detected by the photo-detector and a corresponding analog scan data signal or analog barcode pattern signal is generated.

As indicated at Block C2 in FIG. 9B, the amplification stage amplifies the analog scan data signal, by the gain value determined by the SDGC module 109 during each scanning cycle.

As indicated at Block C3 in FIG. 9B, the A/D conversion stage converts the amplified analog scan data signal into a digital scan data signal, and then into time-sampled digital first derivative data signal f' (t) (i.e. comprising digital words or values) representative or indicative of the strength or magnitude in signal level transitions (e.g. first derivative measures), and other signal characteristics that might be useful during decode processing, as well as the synchronized digital gain control process.

As indicated a Block C4 in FIG. 9B, a discrete gain calculation/estimation process is carried out at the beginning (i.e. start) of each scanning cycle (i.e. in response to detection of the SOS signal) using a two-step method, namely: performing a histogram analysis on the time-sampled digital first derivative data signal f' (t) indicated at Block C4A; and generating a discrete gain value $G(s,t)$ for the amplification stage of the photo-collection and detection module 6, as indicated at Block C4B. In general, the discrete gain signal $G(s, t)$ is a function of the signal strength (e.g. intensity or amplitude), and timing window, $[t1, t2]$. The signal strength could be provided by the digital first derivative signal f' (t) as in FIG. 8A (and FIG. 6A), the digital raw intensity data signal f(t) as in FIG. 3A, or a combination thereof in an alternative embodiment. The timing window t is generated by the SOS/EOS detector which can be implemented in different ways depending on the type of laser scanning system used. The timing window $[t1, t2]$ is generated by the SOS/EOS detector which can be implemented in different ways depending on the type of laser scanning system used. This ensures that gain change occurs only during the synchronized time window (i.e. when the gate timing signal does to a logical high value) so that the signal has constant gain during each scanning cycle (i.e. laser beam sweep).

Figure 9C:
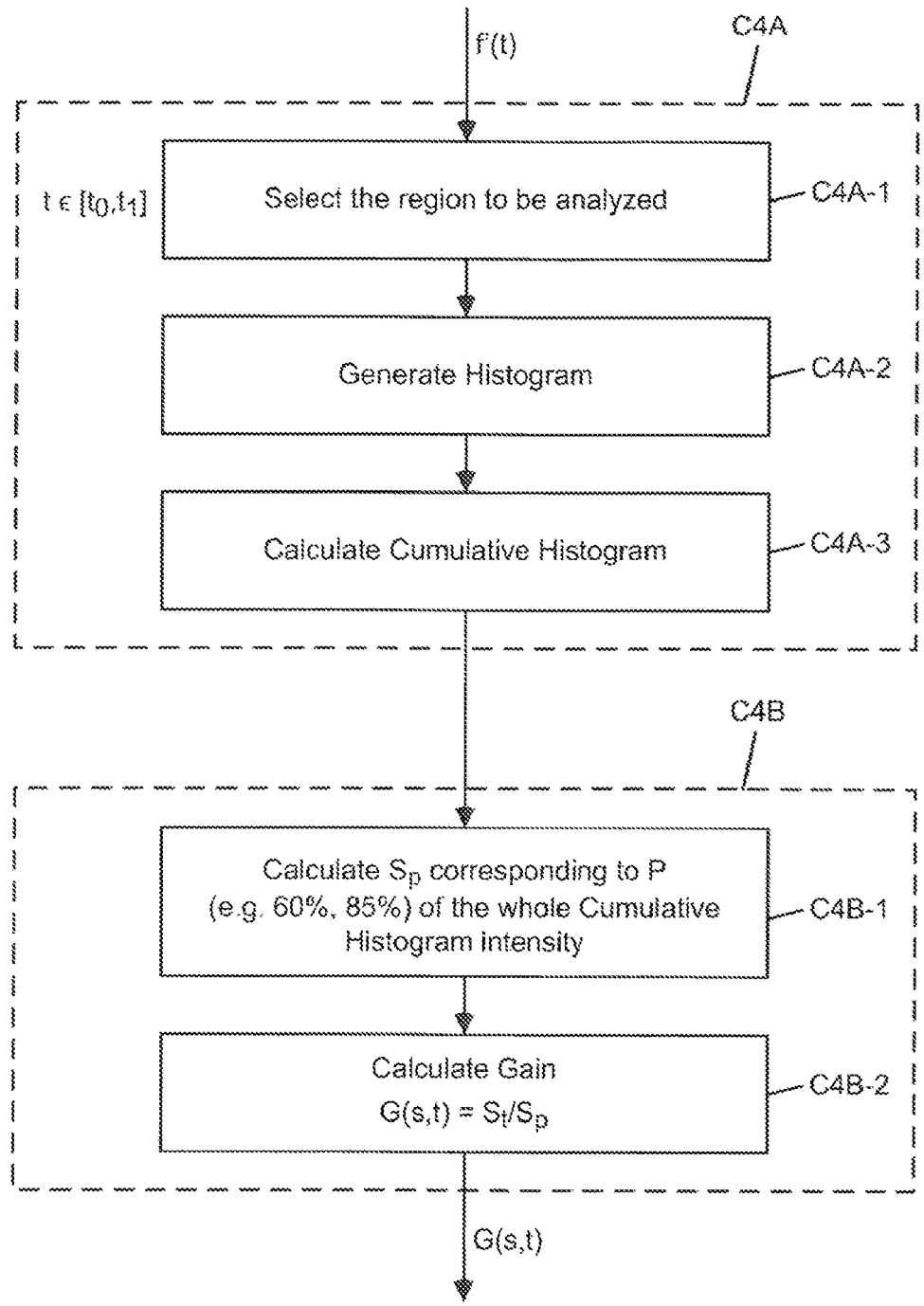
FIG. 9C is a flow chart describing a preferred method of processing the digitized scan data signal within the programmed decode processor of FIG. 8, involving histogram analysis and gain calculation.

In FIG. 9C, the digital gain calculation/estimation process of the preferred embodiment is described in greater detail, as comprising the following steps: at Block C4A-1, selecting a time region over which the sampled digital first derivative data signal f'(t) is to be analyzed (e.g. from t1 to t0); at Block C4A-2, generate a histogram based on the region of the sampled digital scan data signal selected in Block C4A-1; at Block C4A-3, calculating a cumulative histogram based on the histogram generated in Block C4A-2; at Block C4B-1, calculating the current signal level S(p) corresponding to the frequency of the signal level, p, observed over the selected time region (e.g. 60% or 85%) of the whole cumulative histogram intensity value; and at Block C4B-2, calculating the discrete gain value $G(s,t)$, for the current scanning cycle, using the following formula: $G(s,t)=S_t/S_p$ where $S_t$ is the target signal level, and $S_p$ is the current signal level corresponding to p (e.g. 60% or 85%) of the whole cumulative histogram intensity. This process has been described in great technical detail above with reference to FIGS. 5A and 5B, and will not be repeated to avoid redundancy.

As indicated in the SDGC process of FIG. 9B, the discrete gain value $G(s, t)$ calculated in Block C4 is provided to Block C5, where a synchronized gain change value $\Delta G(s, t)$ is computed, for the current time window (i.e. laser beam scanning cycle), determined by time window block C6, driven by SOS/EOS signal generation block C7, as described above. The synchronized discrete gain change value $\Delta G(s,t)$ (i.e. a digital numerical value) is then transmitted to the digitally-controlled analog amplification stage at Block C2, to instantly change the gain of this stage to a new gain value determined by the synchronized discrete gain change value $\Delta G(s,t)$. Thus, by selecting the target signal level $S_t$ at an optimum value of system operation, the SDGC module automatically computes and applies the synchronized discrete gain change value $\Delta G(s, t)$, during each scanning cycle (i.e. time window) so that the output signal level from the digitally-controlled analog amplification stage closely approaches the target signal level $S_t$ and system performance is optimized.

The SDGC process describes above operates in a manner similar to that described in connection with the first illustrative embodiment, and illustrated in FIGS. 3B through 3D.

This SDGC process repeats itself automatically, each and every scanning cycle, in a manner transparent to the system user, to maintain the intensity of processed analog scan data signals relatively constant before conversion into corresponding digital data signals.

Some Modifications which Readily Come to Mind

While synchronized digital gain control (SDGC) module of the present disclosure has been shown implemented inside the programmed decode processor, it is understood that this module could be implemented in other locations, wherever digital signal processing is supported.

As disclosed, the digitized data processed by the SDGC module can be digital raw intensity data and/or digital first derivative data. However, it may also be digital absolute value first derivative data, any other combination of the three different types of digital data.

Also, it is understood that histogram generated by the SDGC module can be analyzed on a whole scan line data or a specific region thereof, and the histogram can be formed with sub-sampling or without sub-sampling.

While the illustrative embodiments disclose the use of a 1D laser scanning module to detect scan bar code symbols on objects, it is understood that a 2D or raster-type laser scanning module can be used as well, to scan 1D bar code symbols, 2D stacked linear bar code symbols, and 2D matrix code symbols, and generate scan data signals for decoding processing.

While various optical code symbol reading systems have been illustrated, it is understood that these laser scanning systems can be packaged in modular compact housings and mounted in fixed application environments, such as on counter-top surfaces, on wall surfaces, and on transportable machines such as forklifts, where there is a need to scan code symbols on objects (e.g. boxes) that might be located anywhere within a large scanning range (e.g. up to 20+ feet away from the scanning system). In such fixed mounted applications, the trigger signal can be generated by manual switches located at a remote location (e.g. within the forklift cab near the driver) or anywhere not located on the housing of the system, as well as by automatically by IR or LED-based object detection subsystems, or manually-actuated trigger switches, well known in the art.

Also, the illustrative embodiments have been described in connection with various types of code symbol reading applications involving 1-D and 2-D bar code structures (e.g. 1D bar code symbols, 2D stacked linear bar code symbols, and 2D matrix code symbols). However, the methods and apparatus can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

The invention claimed is:

1. An indicia reading system, comprising:
a scanning module for scanning a beam across a scanning field in a scanning cycle;
a scan line detector for detecting a start of each scanning cycle performed by the scanning module and generating a start of scan (SOS) signal in response to the detection of the start of each scanning cycle;
a photo-detector for detecting the intensity of light reflected from the scanning field and generating a first signal corresponding to the detected light intensity;
a signal processor having a processing stage for processing the first signal and converting the processed first signal into a second signal comprising at least one of the first signal's raw intensity data, first derivative data, and the absolute value of the first derivative data;
a gain control module for, during each scanning cycle, controlling the gain of the processing stage within the signal processor using the SOS signal generated by the scan line detector and the second signal generated by the signal processor; and
a decode processor for processing the second signal and generating data representative of indicia in the scanning field.

2. The indicia reading system of claim 1, wherein:
in response to the SOS signal during each scanning cycle, the gain control module processes the second signal, generates a digital control signal, and transmits the digital control signal to the signal processor; and
the signal processor's processing stage uses the digital control signal to control the gain of the first signal during each scanning cycle.

3. The indicia reading system of claim 1, wherein, in response to the SOS signal during each scanning cycle, the gain control module processes the second signal, calculates a histogram from the second signal, calculates a cumulative histogram from the calculated histogram, calculates a discrete gain for the scanning cycle from the cumulative histogram, calculates a discrete gain change from the discrete gain, and transmits the discrete gain change as the digital control signal for the scanning cycle to the signal processor.

4. The indicia reading system of claim 3, wherein the histogram is calculated using sub-sampling.

5. The indicia reading system of claim 1, wherein the scanning module comprises a rotating polygon or an oscillating mechanism for scanning the beam across the scanning field.

6. The indicia reading system of claim 1, wherein the scanning module comprises:
a laser source;
a laser drive module for driving the laser source;
a laser scanning mechanism for scanning a laser beam across the scanning field.

7. The indicia reading system of claim 1, wherein the gain control module comprises a programmed microprocessor.

8. The indicia reading system of claim 1, comprising a hand-supportable housing or a fixed-mounted housing.

9. The indicia reading system of claim 1, wherein the scan line detector detects an end of each scanning cycle performed by the scanning module and generates an end of scan signal in response to the detection of the end of each scanning cycle.

10. The indicia reading system of claim 1, comprising at least one light collection optic element for collecting light reflected from the scanning field.

11. An indicia reading system, comprising:
a laser scanning module for scanning a laser beam across a laser scanning field in a scanning cycle;

a scan line detector for detecting a start of each scanning cycle performed by the laser scanning module and generating a start of scan (SOS) signal in response to the detection of the start of each scanning cycle;

a photo-detector for detecting the intensity of light reflected from the laser scanning field and generating a first signal corresponding to the detected light intensity;

a signal processor having an amplification stage for amplifying the first signal followed by a processing stage for processing the first signal and converting the processed first signal into a second signal comprising at least one of the first signal's raw intensity data, first derivative data, and the absolute value of the first derivative data;

a gain control module for, during each scanning cycle, controlling the gain of the processing stage within the signal processor using the SOS signal generated by the scan line detector and the second signal generated by the signal processor; and a decode processor for processing the second signal and generating data representative of indicia in the scanning field;

wherein, in response to the SOS signal during each scanning cycle, the gain control module processes the second signal, calculates a histogram from the second signal, calculates a cumulative histogram from the calculated histogram, calculates a discrete gain for the scanning cycle from the cumulative histogram, calculates a discrete gain change from the discrete gain, and transmits the discrete gain change as the digital control signal for the scanning cycle to the signal processor.

12. The indicia reading system of claim 11, wherein:
in response to the SOS signal during each scanning cycle, the gain control module processes the second signal, generates a digital control signal, and transmits the digital control signal to the signal processor; and the signal processor's processing stage uses the digital control signal to control the gain of the first signal during each scanning cycle.

13. The indicia reading system of claim 11, comprising at least one light collection optic element for collecting light reflected from the laser scanning field.

14. The indicia reading system of claim 11, wherein the histogram is calculated using sub-sampling.

15. The indicia reading system of claim 11, wherein the laser scanning module comprises a rotating polygon or an oscillating mechanism for scanning the laser beam across the laser scanning field.

16. An indicia reading system, comprising:
a scanning module for scanning a beam across a scanning field in a scanning cycle;

a scan line detector for detecting a start of each scanning cycle performed by the scanning module and generating a start of scan (SOS) signal in response to the detection of the start of each scanning cycle;

a photo-detector for detecting the intensity of light reflected from the scanning field and generating a first signal corresponding to the detected light intensity;

a signal processor having a processing stage for amplifying the first signal, processing the first signal, and converting the processed first signal into a second signal comprising at least one of the first signal's raw intensity data, first derivative data, and the absolute value of the first derivative data;

a gain control module for, during each scanning cycle, controlling the gain of the processing stage within the signal processor using the SOS signal generated by the scan line detector and the second signal generated by the signal processor; and a decode processor for processing the second signal and generating data representative of indicia in the scanning field;

wherein, in response to the SOS signal during each scanning cycle, the gain control module processes the second signal, calculates a histogram from the second signal, calculates a cumulative histogram from the calculated histogram, calculates a discrete gain for the scanning cycle from the cumulative histogram, calculates a discrete gain change from the discrete gain, and transmits the discrete gain change as the digital control signal for the scanning cycle to the signal processor.

17. The indicia reading system of claim 16, wherein the gain control module comprises a programmed microprocessor.

18. The indicia reading system of claim 16, comprising a hand-supportable housing or a fixed-mounted housing.

19. The indicia reading system of claim 16, wherein the scan line detector detects an end of each scanning cycle performed by the scanning module and generates an end of scan signal in response to the detection of the end of each scanning cycle.

20. The indicia reading system of claim 16, comprising at least one light collection optic element for collecting light reflected from the scanning field.

* * * * *